US012797783B2

(12) United States Patent
Harris et al.

(10) Patent No.: US 12,797,783 B2
(45) Date of Patent: Nov. 17, 2026

(54) SELF-RELEASING FILTER CONNECTOR

(71) Applicant: FILTRATION TECHNOLOGY CORPORATION, Houston, TX (US)

(72) Inventors: James D. Harris, Houston, TX (US); Christopher D. Wallace, Houston, TX (US)

(73) Assignee: FILTRATION TECHNOLOGY CORPORATION, Houston, TX (US)

( * ) Notice: Subject to any disclaimer, the term of this patent is extended or adjusted under 35 U.S.C. 154(b) by 376 days.

(21) Appl. No.: 18/563,914

(22) PCT Filed: Jul. 21, 2022

(86) PCT No.: PCT/US2022/037947

§ 371 (c)(1),
(2) Date: Nov. 23, 2023

(87) PCT Pub. No.: WO2022/251755

PCT Pub. Date: Dec. 1, 2022

(65) Prior Publication Data

US 2025/0083083 A1 Mar. 13, 2025

(51) Int. Cl.
*B01D 46/24* (2006.01)

(52) U.S. Cl.
CPC .... *B01D 46/2414* (2013.01); *B01D 2271/027* (2013.01)

(58) Field of Classification Search
CPC .......... B01D 46/2414; B01D 2201/347; B01D 2201/298; B01D 2271/027; B01D 2313/041
See application file for complete search history.

(56) References Cited

U.S. PATENT DOCUMENTS

| | | | | |
|---|---|---|---|---|
| 3,344,923 | A | 10/1967 | Pall et al. | |
| 4,228,012 | A | 10/1980 | Pall | |
| 6,096,207 | A | 8/2000 | Hoffman et al. | |
| 9,061,247 | B2 * | 6/2015 | Chikura | B01D 63/12 |
| 2003/0178354 | A1 | 9/2003 | Wall | |
| 2015/0336041 | A1 * | 11/2015 | Hatfield | B01D 46/88 55/482 |

OTHER PUBLICATIONS

International Search Report and Written Opinion for Application No. PCT/US22/37947.

* cited by examiner

*Primary Examiner* — Benjamin M Kurtz
(74) *Attorney, Agent, or Firm* — Boulware & Valoir PLLC

(57) ABSTRACT

A filter element with end caps and seal that allows quick release of the filter element from a filter vessel is described.

11 Claims, 38 Drawing Sheets

SELF-RELEASING FILTER CONNECTOR

PRIOR RELATED APPLICATIONS

This application is a 371 national phase application of PCT/US2022/037947, filed Jul. 21, 2022, which claims priority to U.S. Ser. No. 63/192,484, filed May 24, 2021, each of which is incorporated by reference for all purposes.

FIELD OF THE DISCLOSURE

The disclosure generally relates to a connector that allows quick release of a filter element from a filter vessel, and more particularly to a connector having two annular surfaces of different diameters to allow an annular seal to move from the larger annular surface to the smaller annular surface to facilitate removal of the filter element.

BACKGROUND OF THE DISCLOSURE

The majority of filters, especially filters or coalescers that are designed remove a large percentage of particles or liquid droplets from the inlet fluid (also known as high efficiency filters and coalescers) require a very reliable seal to avoid bypass of the contaminant. This seal is typically elastomeric and in the form of an o-ring, v-shaped ring, or U-shaped. They can be made of other materials besides elastomers, for example PFTE, etc. If the filter or coalescer elements ("Filters") do not seal to their respective sealing surfaces on the pressure vessel, they would not be able to meet their published particle or liquid containment removal efficiency ratings. Therefore, having a positive seal on a filter is critical to its function.

Another thing to note about filters is they are not permanently installed in their vessels or housings ("vessel"). In almost all cases or at least all cases this product is intended to be used in, the filters have short life of days to as long as one year. At the point they reach the end of their life, which is determined either by their terminal differential pressure rating or a maximum recommended life in a process, they are either removed and disposed of or cleaned. A new set of filters is typically installed in the vessel and the cycle begins again. As a result, easy installation, and removal of the filter elements is critical to those who operate this equipment.

If the installation or insertion of the element is difficult, it can create several issues or hazards. It can create a safety hazard if an operator must use unreasonable force or a tool to try to install an element, which may lead to injury. If a filter is difficult to install, an operator may choose not to install it properly, and as a result, the seal might not be engaging, and the filter will bypass the contaminant it is intended to remove. If a filter is difficult to install, an operator might damage the element during installation, which may result in creating a bypass point in the filter or the vessel that can be detrimental to the downstream process. If the filter is not properly engaged and seated in its intended receiver in the vessel, it might move around the vessel due to turbulence caused by the fluid. This can result in damage to the element. Small fragments of the element might break off and flow downstream. These large particles can plug or foul downstream equipment. The impact can be millions of dollars in losses to the operator. If the filter and seal are not properly engaged in the intended receiver sealing surface, the bypass point created can result in a build up of particles on the dirty side of the seal, making extraction of the element more difficult. The result might be an operator having to use heavy equipment or tools that are not designed for this task leading to a major safety hazard.

The installation or insertion of the filters is less of an issue than extraction. This is due to the harsh environment the filters are exposed to during the process of filtering. Fluid chemistries, operating temperatures and pressure changes can vary causing chemical and thermal compatibility challenges to filter components, especially the seals. Seals are very susceptible to swelling due to absorption of the process fluids. This is very prominent in high pressure gas applications as the small gas molecules can enter the pores of the elastomers under the high operating pressure conditions of compressed gases. The phenomenon is also known as "rapid gas decompression." When pressure is released to change filters, the temperatures can change significantly, causing thermal compatibility issue with the seals. But more importantly, these gases trapped in the pores can expand, causing the seals to swell. Seals can increase in size by significant percentages of their original size, easily 10% to 200%. Considering a filters seal is typically designed for 0.008 inch-0.040-inch compression per side of the seal and the seals typically range from cross sectional areas of 0.125 inch to 0.250 inch, any increases of percentages to these cross-sectional areas will create an undesirable situation for an operator trying to remove the filters. This swelling can make the filter physically impossible to remove as designed. Therefore, requiring the operator to use unconventional and unrecommended methods for removal.

Also, consider filter equipment is typically outdoors and in very hot or very cold environments. The harsh conditions and the wetness and dirtiness of the process of changing filters usually leads to an operator wanting to change filters quickly. Difficult filter extraction can lead to negligence, resulting in injury or catastrophic failure of their processes.

Therefore, there is a need for a filter element that can be easily installed and reliably removed, while providing sufficient separation for single, two- or multi-stage filtration.

SUMMARY OF THE DISCLOSURE

The filter element of this disclosure describes an end cap with a reliable seal, wherein the end cap can be inserted easily during installation, and can also be safely and reliably extracted if the seal is swollen and difficult to extract. The end cap can be used on various filter element styles. In particular, it ensures a positive seal while solving the issue of difficult extraction by providing a reliable mechanism for releasing the seal compression to a smaller diameter, thus reducing the friction between the seal and the filter vessel that holds the filter element.

The end cap of this disclosure eliminates the need to retrieve the conventional chevron or V-shaped seal after extracting the filter element. The end cap also reduces or eliminates the need for a special tool for extraction.

In one aspect of this disclosure, an end cap assembly for facilitating removal of a filter element from a filter receiver is described. The end cap comprises: a first end cap having an annular ledge having a first diameter; an annular seal annularly surrounding the first end cap at the annular ledge; and a second end cap having an annular seat having a second diameter that is smaller than the first diameter; wherein the second end cap is operatively coupled with the first end cap such that when the first end cap moves relative to the second end cap, the two caps are allowed to partially separate and the annular seal can move from the annular ledge of the first end cap to the annular seat of the second end cap. The capability to partially separate the two end caps enables easy extraction in the case of RGD, while also allows for quick installation and necessary sealing.

In another aspect of this disclosure, an end cap assembly for facilitating removal of a filter element from a filter receiver is described. The end cap comprises: a connector having an annular ledge having a first diameter and an annular seating surface having a second diameter that is smaller than the first diameter; an annular seal annularly surrounding the connector; and a retainer ring coupled with the connector at the annular seating surface; wherein the retainer ring is operatively coupled with the connector such that when the retainer ring moves relative to the connector, the annular seal moves from the annular ledge to the annular seating surface, resulting in a smaller diameter that allows the filter elements to be readily extracted.

In one aspect of this disclosure, a filter element is described. The filter element comprises: a first filter section having a distal end and a first connecting end, wherein the first filter section is generally cylindrical in shape; a second filter section having a distal end and a second connecting end, wherein the second filter section is generally cylindrical in shape; a first end cap secured to the first connecting end of the first filter section, wherein the first end cap having an annular ledge having a first diameter; an annular seal annularly surrounding the first end cap; and a second end cap secured to the second connecting end of the second filter section, wherein the second end cap having an annular seat having a second diameter that is smaller than the first diameter; wherein the second end cap is operatively coupled with the first end cap such that when the first end cap moves relative to the second end cap, the two caps are allowed to partially separate and the annular seal moves from the annular ledge of the first end cap to the annular seat of the second end cap.

In an embodiment of the filter element described herein, the first end cap is coupled with the second end cap through snap fit or twist-lock or threading. However, other coupling mechanism may also be employed, as long as the relative movement between the two end caps allows the seal to change its location from a larger diameter to a smaller diameter without falling off the end caps.

In another aspect of this disclosure, a filter element is described, comprising: a first filter section having a distal end and a first connecting end, wherein the first filter section is generally cylindrical in shape; a second filter section having a distal end and a second connecting end, wherein the second filter section is generally cylindrical in shape; a connector secured to the first connecting end of the first filter section and the second connecting end of the second filter section, wherein the connector having an annular ledge having a first diameter and an annular seating surface having a second diameter that is smaller than the first diameter; an annular seal annularly surrounding the connector; and a retainer ring coupled with the connector at the annular seating surface; wherein the retainer ring is operatively coupled with the connector such that when the retainer ring moves relative to the connector, the annular seal moves from the annular ledge to the annular seating surface.

The term "end cap" refers to a structure attached to a distal end of the filter media to provide necessary structural integrity of the filter element. The end cap may or may not comprise an opening for fluidic communication with the filter media.

The term "seal" refers to a structural part that prevents fluid bypass between either side of the seal. The material of the seal may differ depending on the design need and conditions under which it is used.

The term "connector" refers to a structural part that connects two sections of filter elements.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

DETAILED DESCRIPTION

The disclosure provides novel end cap having the capability of moving the seal from a first diameter to a smaller second diameter, such that the friction between the seal and the vessel is reduced or eliminated, in order to safely and easily extract the filter element from the vessel.

Figure 4A:
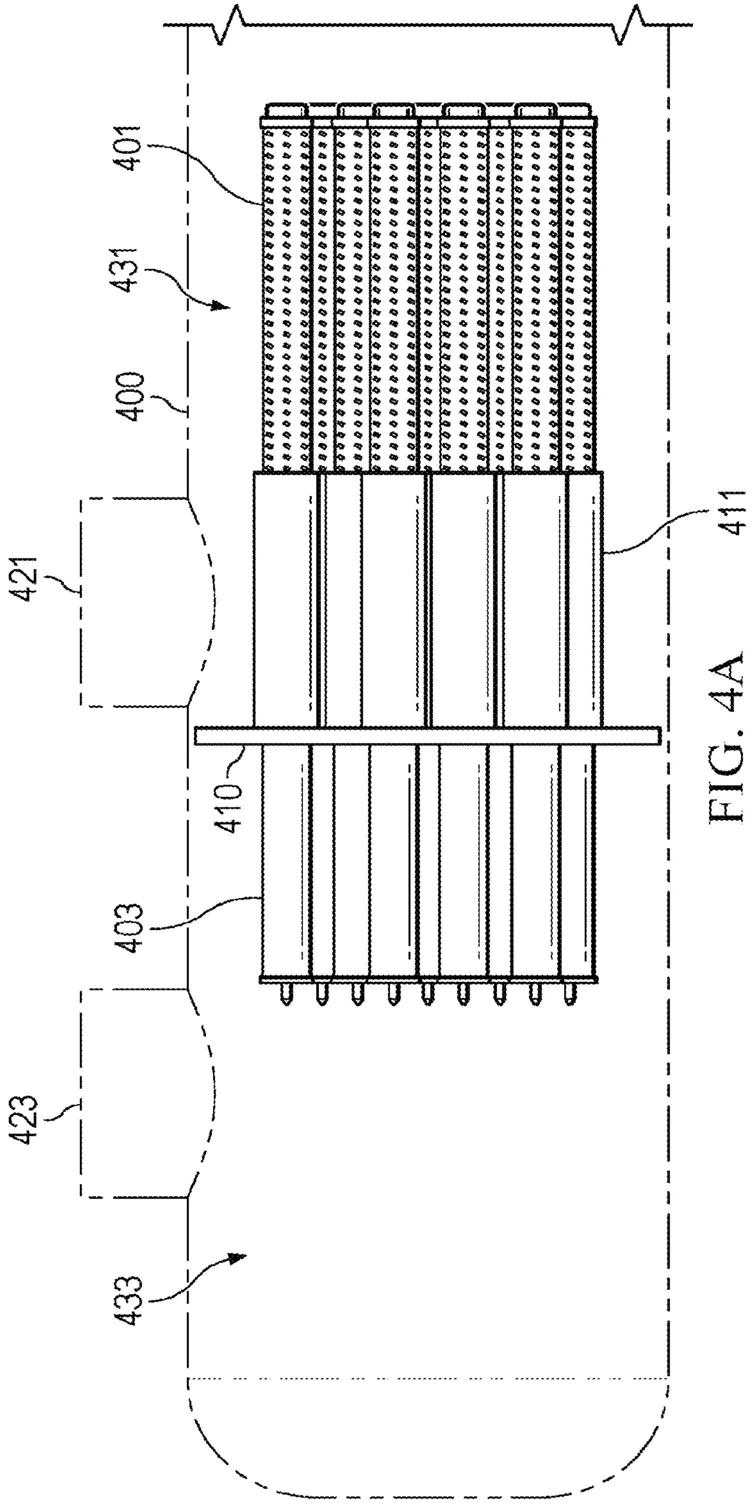
FIG. 4A (PRIOR ART)
FIG. 4A-D. Perspective view of a typical filter housing and filter elements.

FIG. 4A shows a typically filter housing 400 that has a separation plate 410 separating the space inside the housing into a first chamber 431 and a second chamber 433. On the separation plate 410 there are a plurality of risers (or filter receivers) 411, each receives a filter element, comprising a first filter section 401 and a second filter section 403. The first filter section 401 may have the same or different filter media (i.e. made of the same or different materials, or having the same or different pore size) as the second filter section 403. A fluid inlet 421 is fluidically connected to the first chamber 431, and a fluid outlet 423 is fluidically connected to the second chamber 433.

Figure 4B:
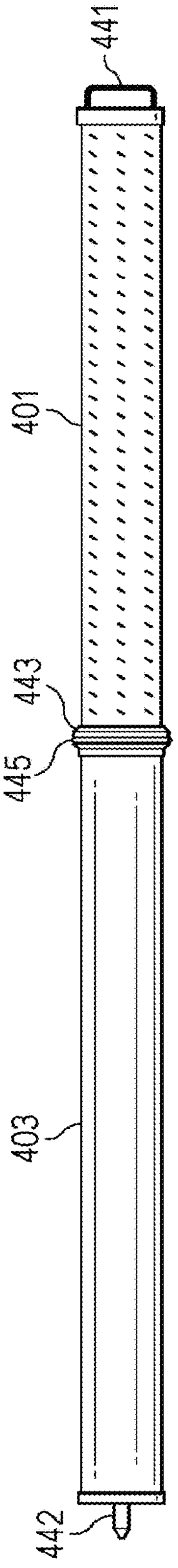
FIG. 4B (PRIOR ART)
Figure 4C:
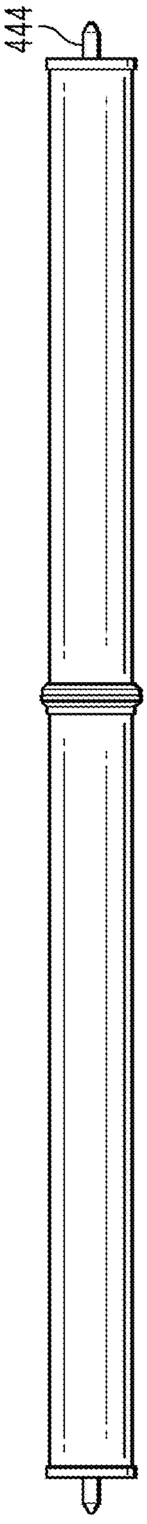
FIG. 4C (PRIOR ART)
Figure 4D:
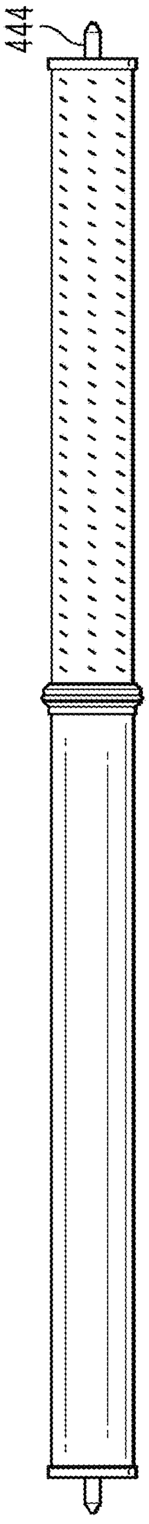
FIG. 4D (PRIOR ART)

Please refer to FIG. 4B, which shows a cross sectional view of the filter element. The filter element can have a handle 441 on the distal end for easier installation and removal. Other configuration such as a bullet style stob 444 can also be used to extract the filter element. An end cap 443 is provided to connect the first filter section 401 and the second filter section 403. An annular seal 445 is also provided to contact the inner surface of the filter receiver 411, thereby creating a seal between the first chamber 431 and the second chamber 433.

Referring also back to FIG. 4A, the dirty fluid to be filtered flows in from the fluid inlet 421, passing through the first filter section on an outside-in fashion for filtration. The filter element also has a hollow core so that the fluid flowing across the first filter section will travel toward to the second filter element 403. From there, the fluid will again flow across the second filter section on an inside-out fashion, and eventually exits the housing 400 through the second exit 423.

The annular seals, when contacting with the inner surface of the filter receiver 411, the annular seal is compressed, allowing the entire filter element to sit properly inside the filter receiver, while providing a fluid barrier outside the filter element between the two sections. However, the compression of the annular seal may exert too high a friction force, making it difficult to remove the filter element as intended.

Therefore, an operator can easily extract the filter element from the filter receiver by installing filter elements having the end cap as described herein. The end cap comprises a first end cap having an annular ledge having a first diameter; an annular seal annularly surrounding the first end cap at the annular ledge; and a second end cap having an annular seat having a second diameter that is smaller than the first diameter; wherein the second end cap is operatively coupled with the first end cap such that when the first end cap moves relative to the second end cap, the annular seal moves from the annular ledge of the first end cap to the annular seat of the second end cap.

Alternatively, the end cap may comprise a connector having an annular ledge having a first diameter and an annular seating surface having a second diameter that is smaller than the first diameter; an annular seal annularly surrounding the connector; and a retainer ring coupled with the connector at the annular seating surface; wherein the retainer ring is operatively coupled with the connector such that when the retainer ring moves relative to the connector, the annular seal moves from the annular ledge to the annular seating surface.

Filter elements having the end cap described herein are also be described herein, with references to FIGS. 1-3.

Example 1

Figure 1A:
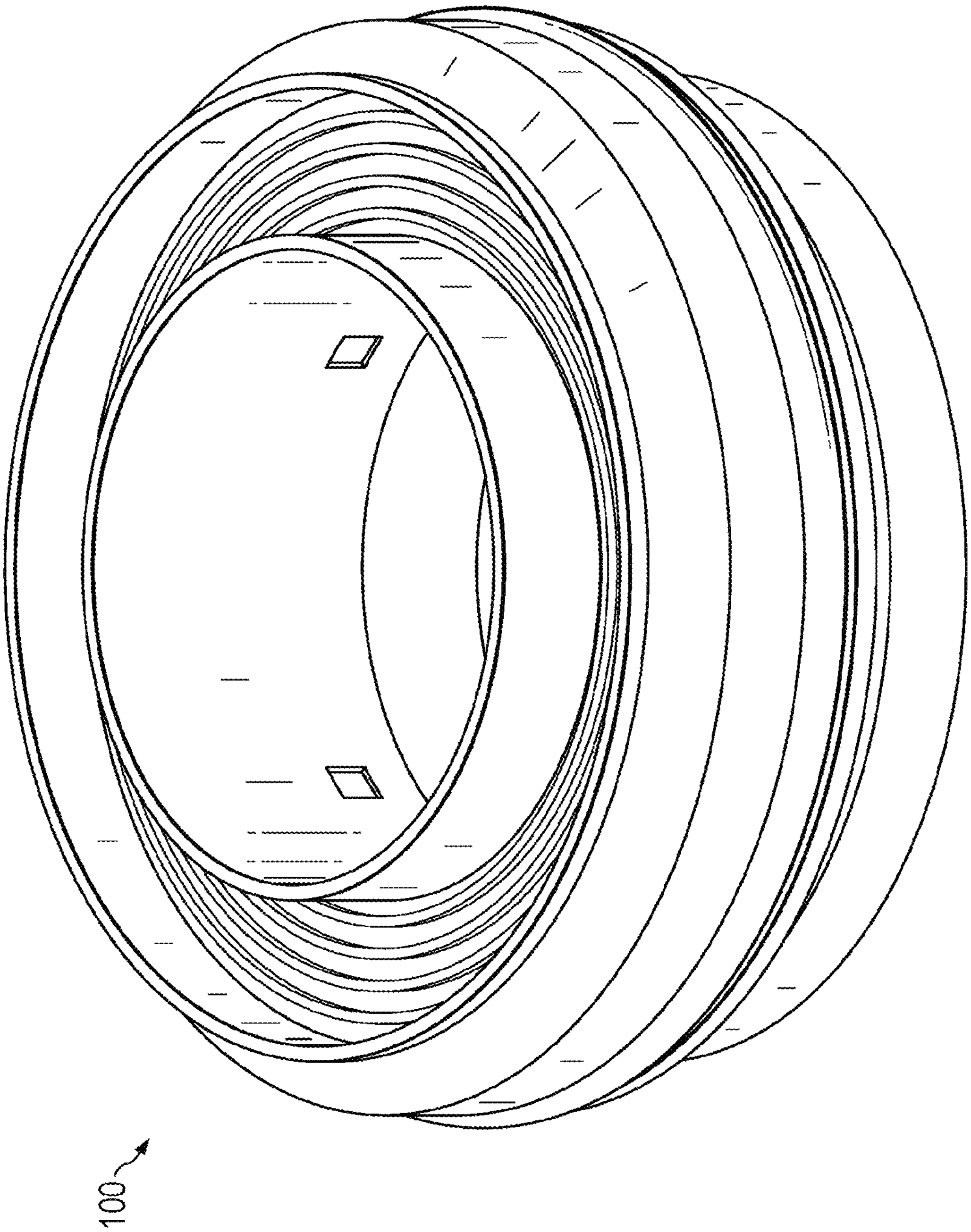
FIG. 1A-J. Illustration of the end cap according to an embodiment of this disclosure.
Figure 1B:
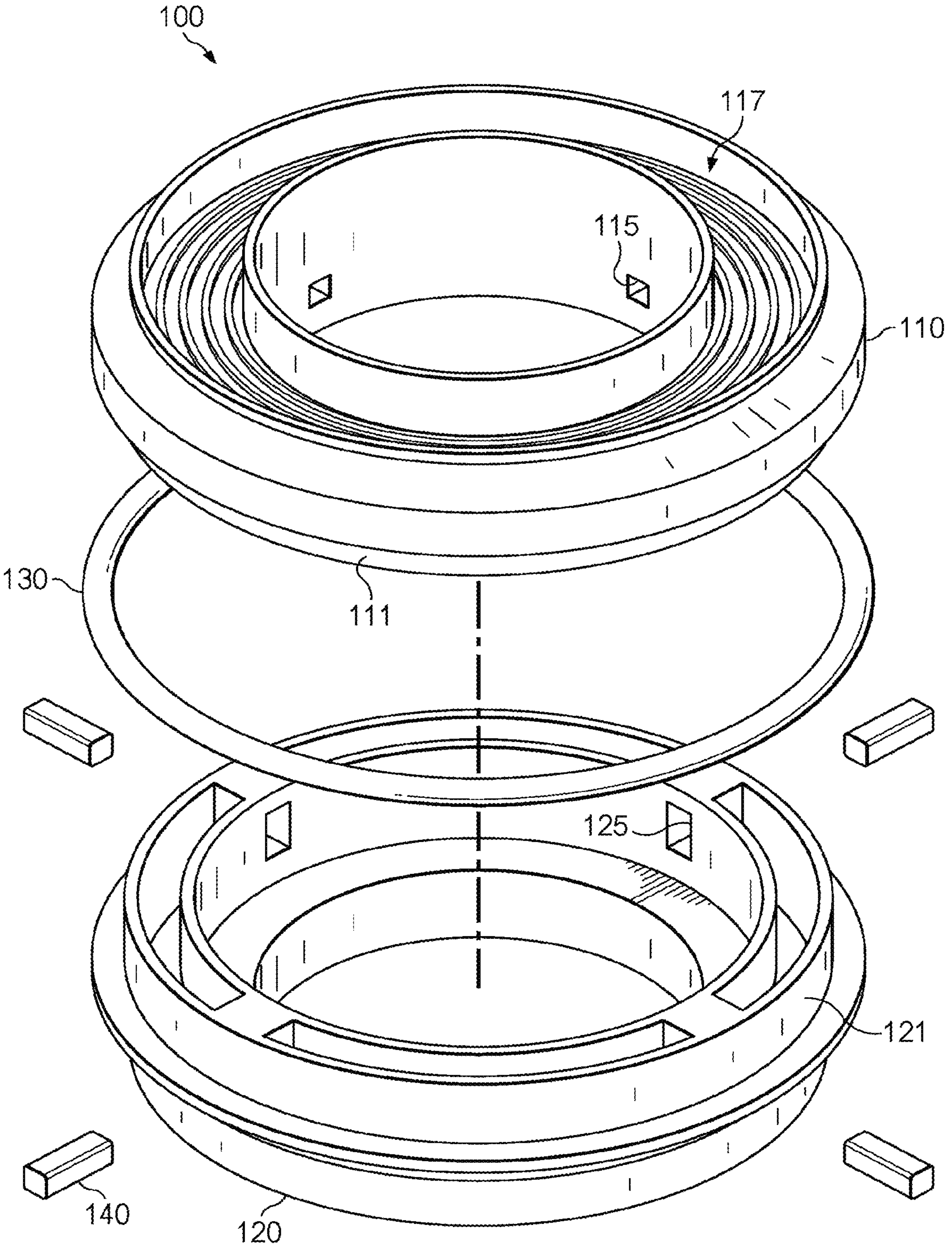

Please refer to FIGS. 1A-J, which shows different views of the joint cap 100 in operation. FIG. 1A shows a perspective view of the joint cap 100, and FIG. 1B shows an exploded view of the joint cap 100, comprising a first end cap 110, a second end cap 120, and an o-ring seal 130. The first end cap 110 has four holes 115, and the second end cap 120 also has four holes 125 corresponding to those on the first end cap 110. Four retaining pins 140 are provided, such that when the first end cap 110 snap-fits with the second end cap 120, the four retaining pins 140 can be inserted into the four holes 115, 125 to maintain the coupling between the two end caps 110, 120.

Figure 1C:
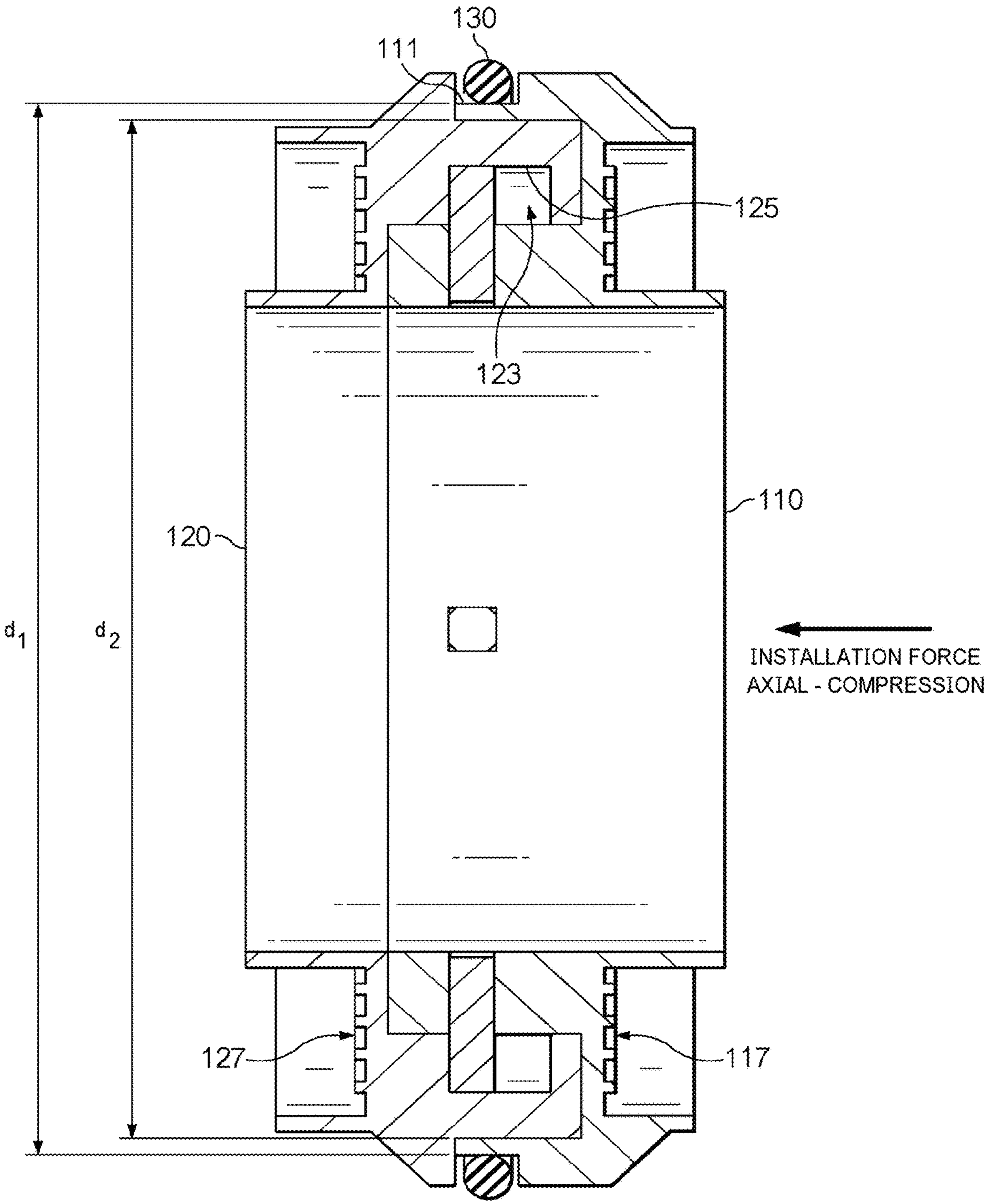

In operation prior to installation, as shown in the cross-sectional view in FIG. 1C, the o-ring seal 130 seats on an annular ledge 111 of the first end cap 110 having a first diameter $d_1$. Correspondingly, the second end cap 120 has an annular seat surface 121 of a second diameter $d_2$. The second diameter $d_2$ is smaller than the first diameter $d_1$. The first end cap 110 has an annular recess 117 to be securely connected to filter media (not shown, further discussed with reference to FIG. 1G). Similarly, the second end cap 120 has an annular recess 127 to be securely connected to filter media. An enlarged view of the top portion of FIG. 1C is shown in FIG. 1D.

Figure 1D:
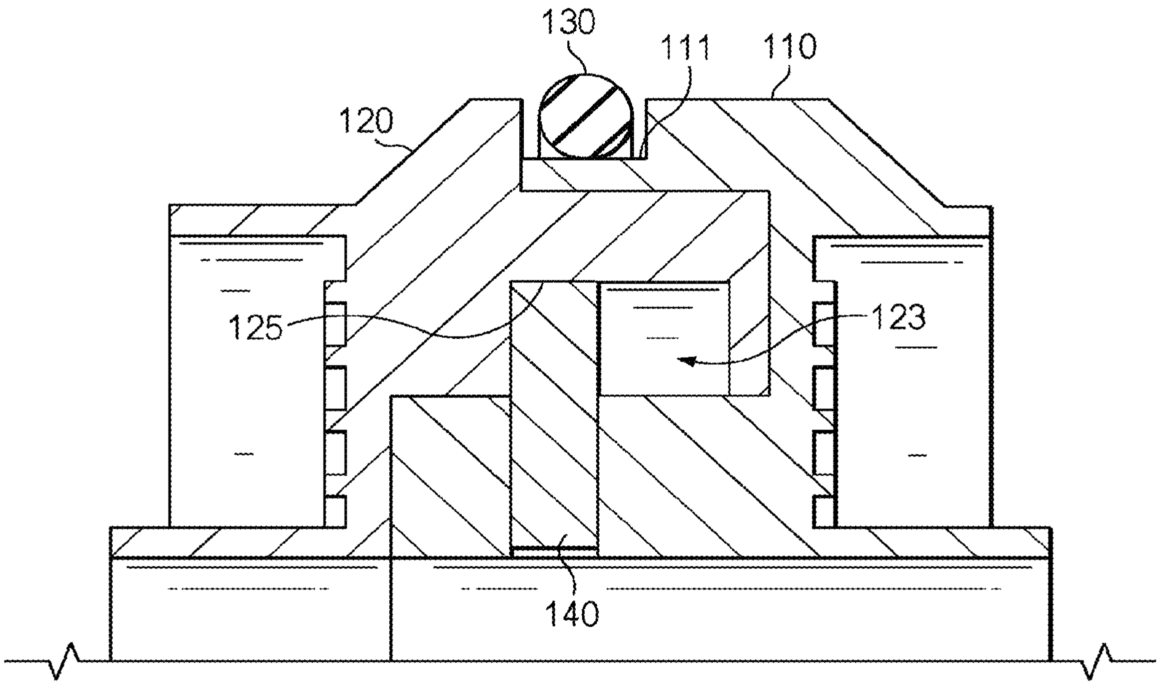

As shown in FIGS. 1C and 1D, the hole 125 in the second end cap 120 further comprises a sliding space 123, such that after the first end cap 110 is coupled with the second end cap 120, the sliding space 123 allows relative sliding movement between the two end caps 110, 120. In FIG. 1C, the arrow shows the direction of insertion into a filter vessel (not shown). The axial compressive force ensures that the two end caps 110, 120 are snapped-fit into each other, and the o-ring seal 130 remains sitting on the ledge 111 of the first diameter $d_1$.

Figure 1E:
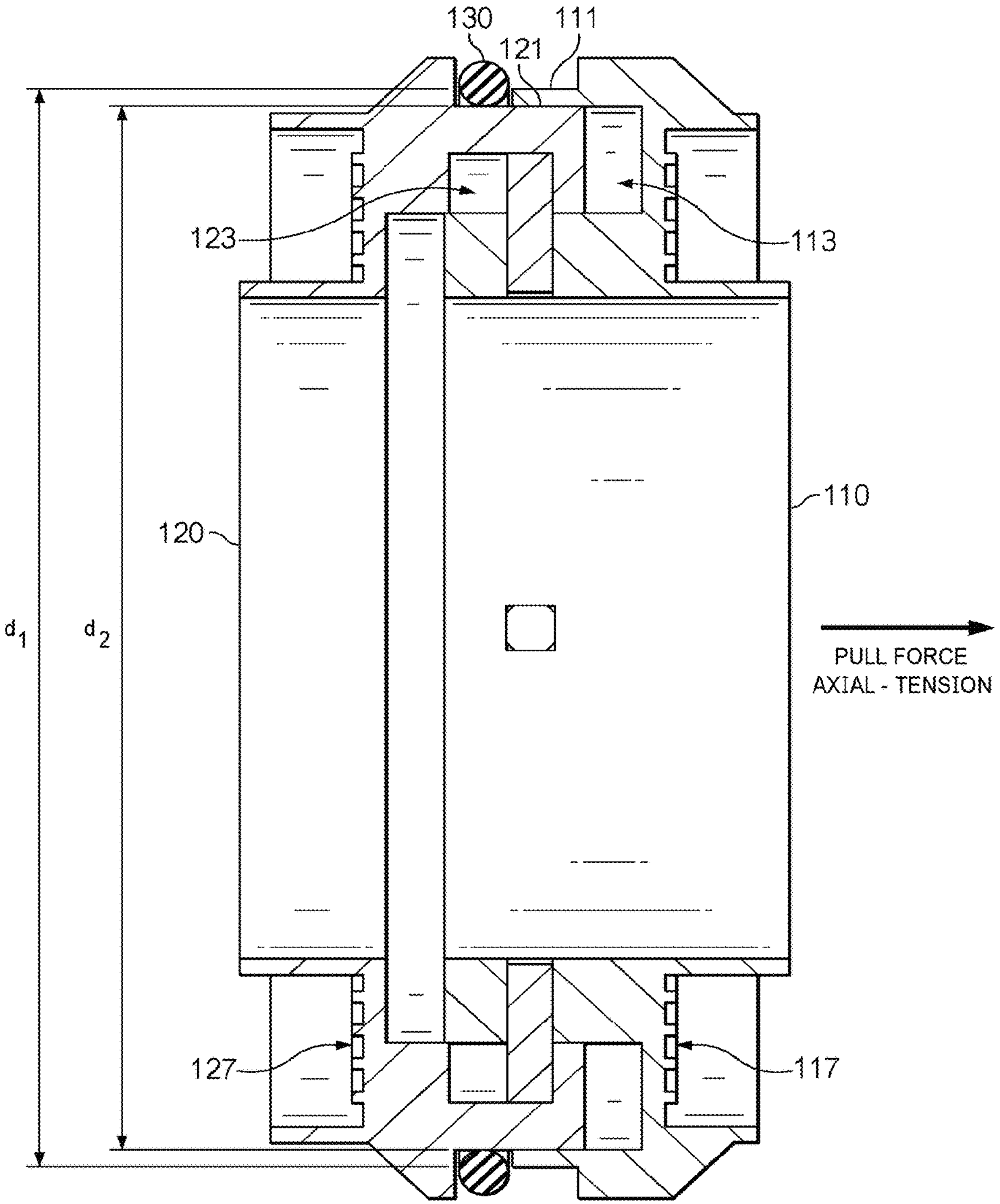
Figure 1F:
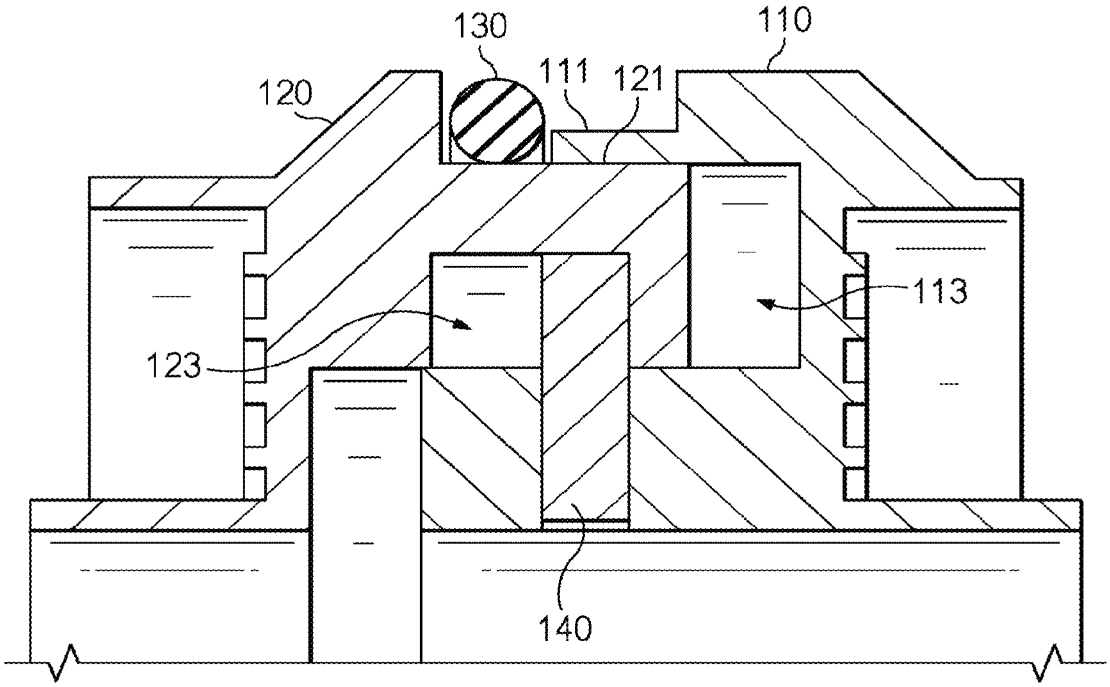

Please refer now to FIGS. 1E-F, which shows the "disengage" configuration. When the user decides to remove the filter elements from the vessel, the filter element will be pulled away as shown in the arrow. The pull tension force allows the first end cap 110 to slide away from the second end cap 120 ("disengage"). The friction between the o-ring seal 130 and the vessel (see FIG. 1G-H) causes the o-ring to roll back into the seating surface 121 on the second end cap 120. By design, the seating surface 121 on the second end cap 120 has a smaller diameter $d_2$, and the o-ring seal 130, made of elastic material, now shrinks and reduces its contact with the vessel, if at all. An enlarged view of the top portion of FIG. 1E is shown in FIG. 1F.

Figure 1G:
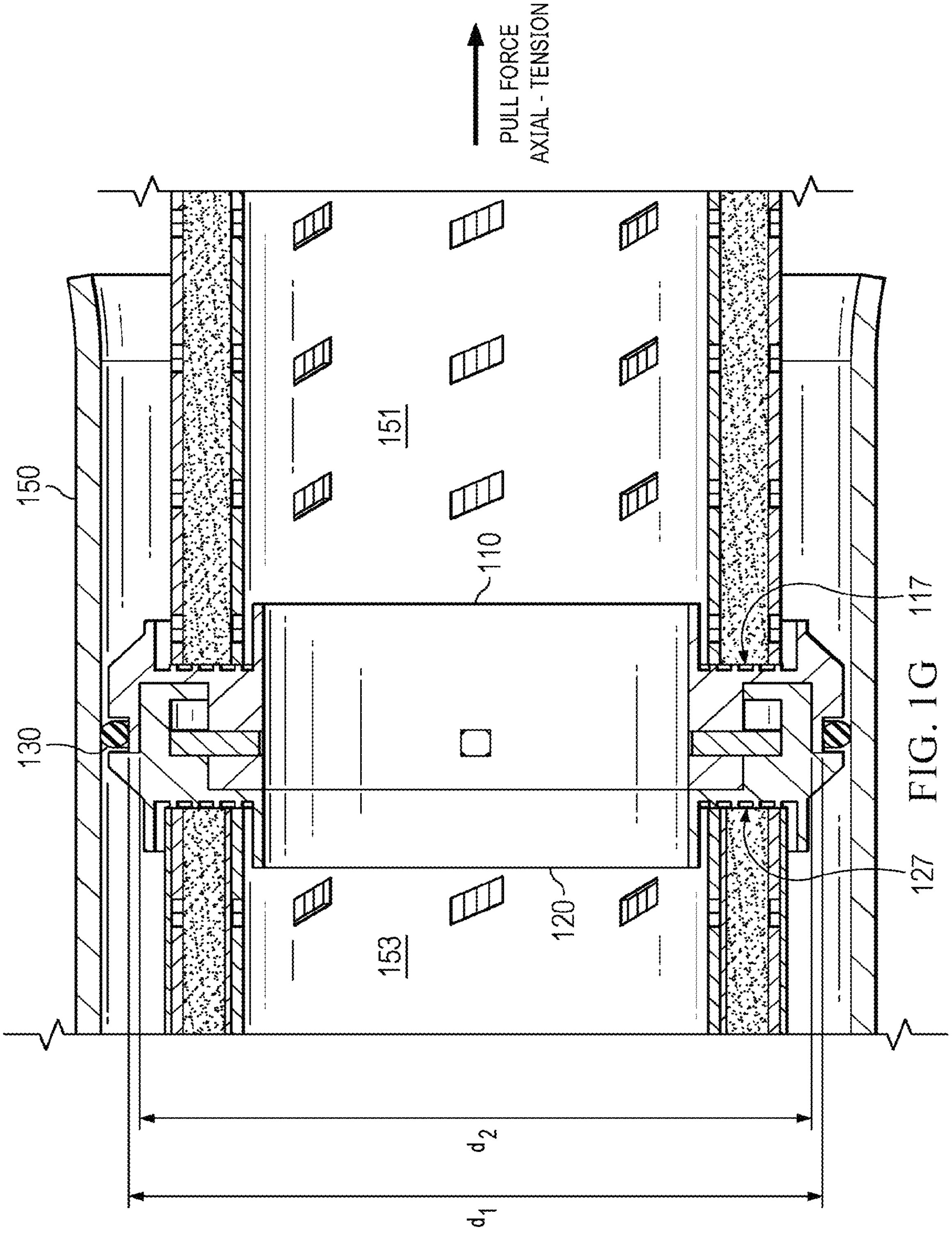
Figure 1H:
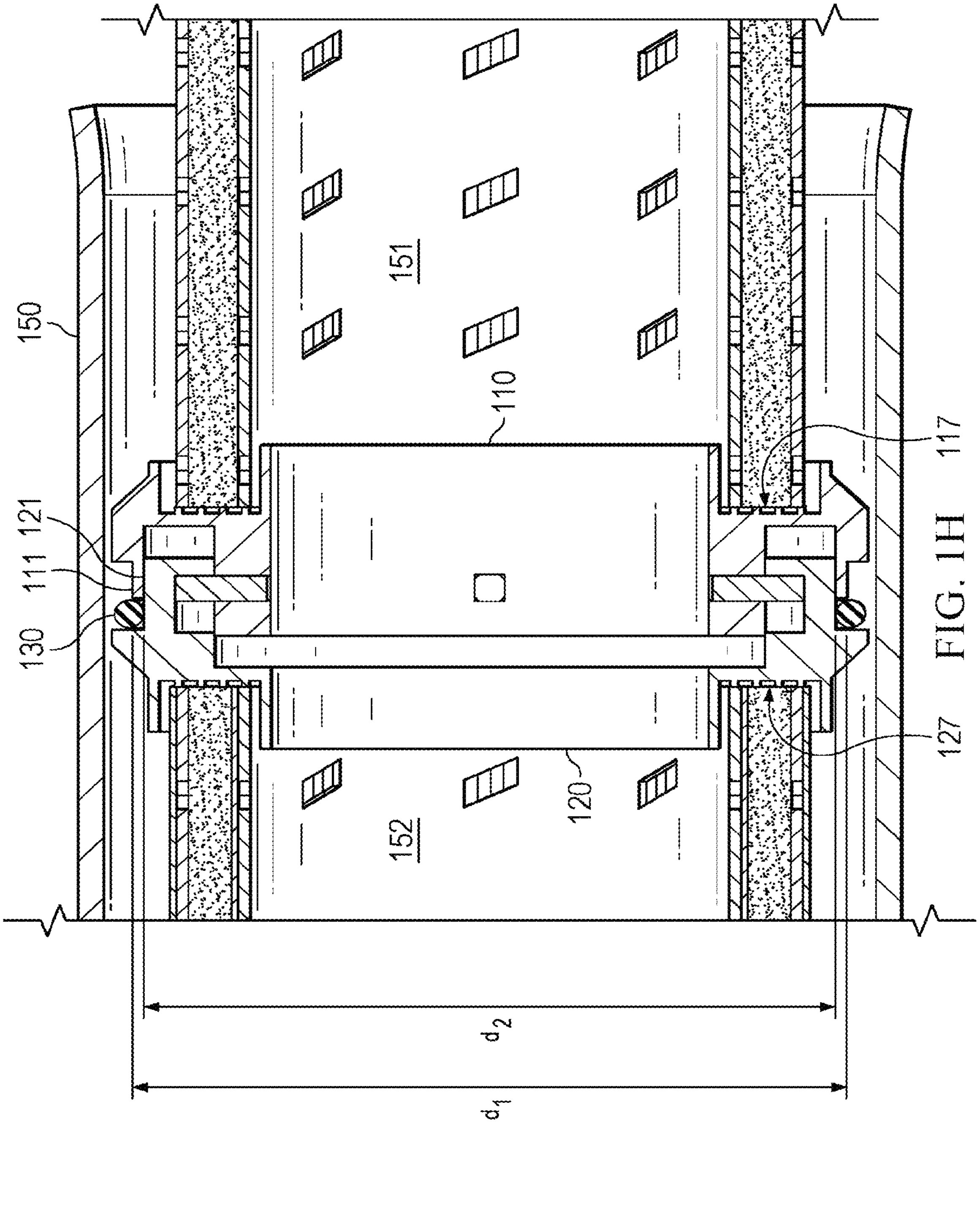
Figure 1I:
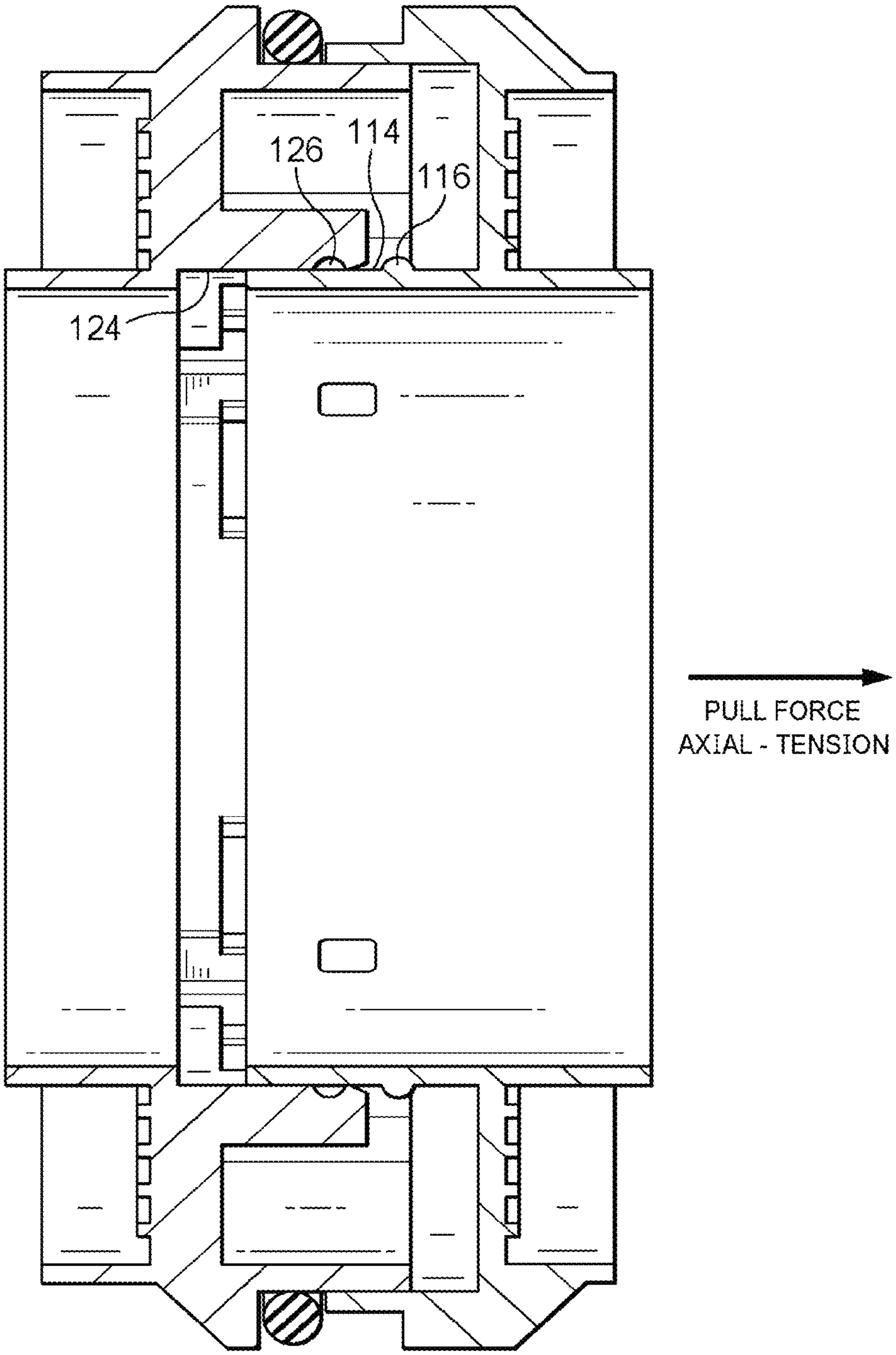
Figure 1J:
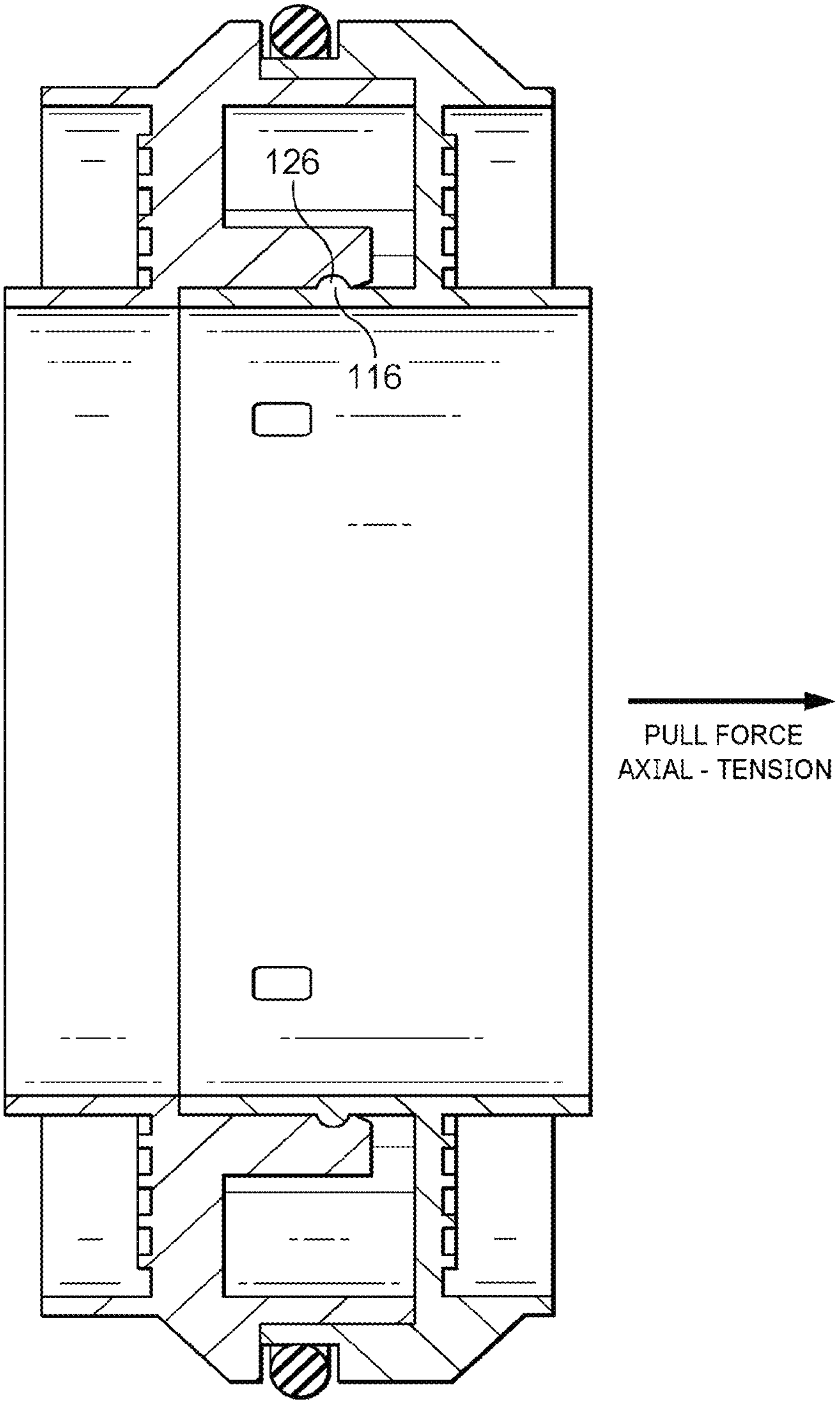

Alternatively, as shown in FIGS. 1I-J, a snap-locking feature may be added to secure the engagement between the first end cap 110 and the second end cap 120. The second end cap 120 having an inner annular sidewall 124 that is to come in close contact with an outer surface 114 on the first end cap 110. The annular sidewall 124 comprises a annular recess 126, whereas the outer surface 114 comprises a matching annular ring structure 116, such that when the first and second end caps 110, 120 are compressed against each other, they will snap-fit at the annular recess 126 and the annular ring structure 116. The snap-fit works along with the friction force created between the o-ring seal 130 and the filter section (further discussed below with regard to FIG. 4) in order to keep filters in place during shipping, storage, installation or filtration, while also allowing easy removal.

Please refer to FIGS. 1G-H that show the extraction of the filter element. As shown in FIG. 1G, the joint cap is connected to a first filter section 151 at the first recess 117 of the first end cap 110, and connected to a second filter section 153 at the second recess 127 of the second end cap 120. The o-ring seal 130 sits on the ledge on the first end cap 110, and due to its larger diameter $d_1$, the o-ring seal 130 contacts the inner surface of the vessel 150, thus creating a seal separating the first filter section 151 from the second filter section 153. A pull force is applied according to the arrow, thus pulling the first end cap 110 slightly away from the second end cap 120, revealing the seating surface 121 that is previously covered by the ledge 111.

Due to the friction force between the o-ring seal 130 and the inner surface of the vessel 150, the o-ring seal rolls back to the now-revealed seating surface 121. Because of the smaller diameter $d_2$ of the seating surface 121, the o-ring seal 130 now shrinks and no longer contacts the inner surface of the filter receiver 150 within a vessel, thus reducing or eliminating the friction force. The filter element can then be easily extracted from the filter receiver 150.

A person skilled in the art would readily understand that the end caps of this disclosure can be applied to other filtration devices, such as gas/liquid separator or coalescing devices, that require frequent change or maintenance of filters. The configurations of the end caps with the o-ring seal enables quickly releasing the filters at removal, as well as reliable installation.

Example 2

Figure 2A:
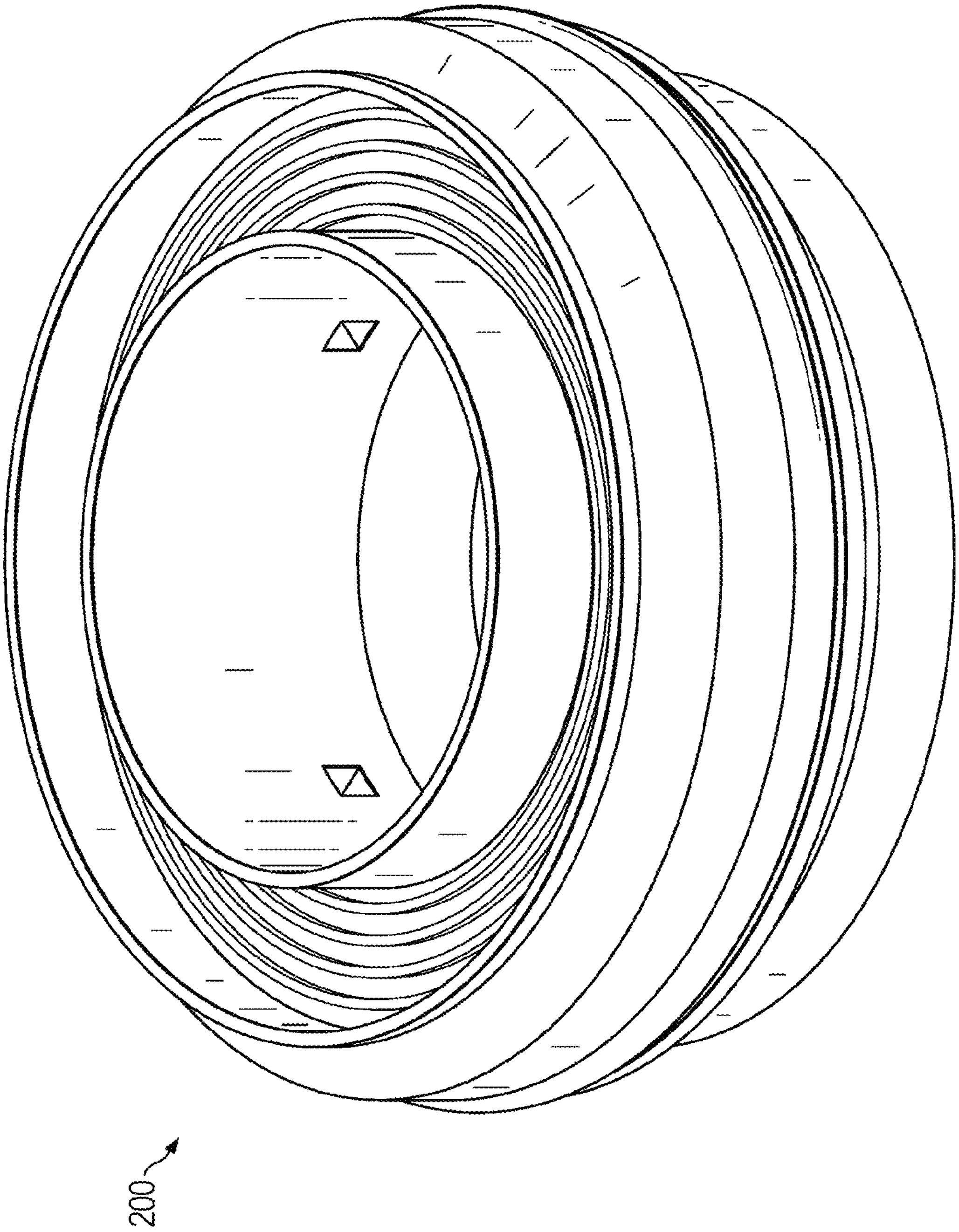
FIG. 2A-N. Illustration of the end cap according to another embodiment of this disclosure.
Figure 2B:
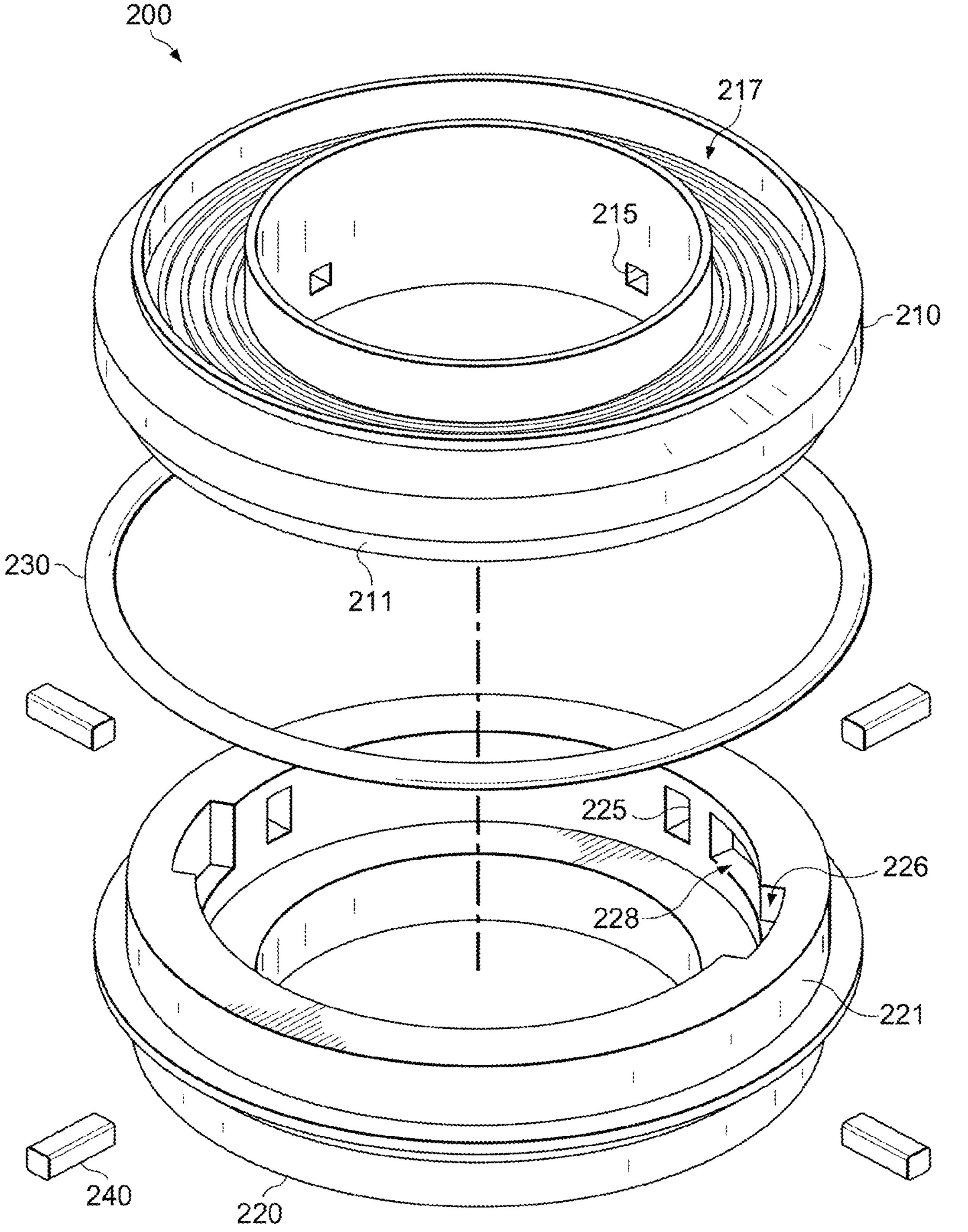
Figure 2C:
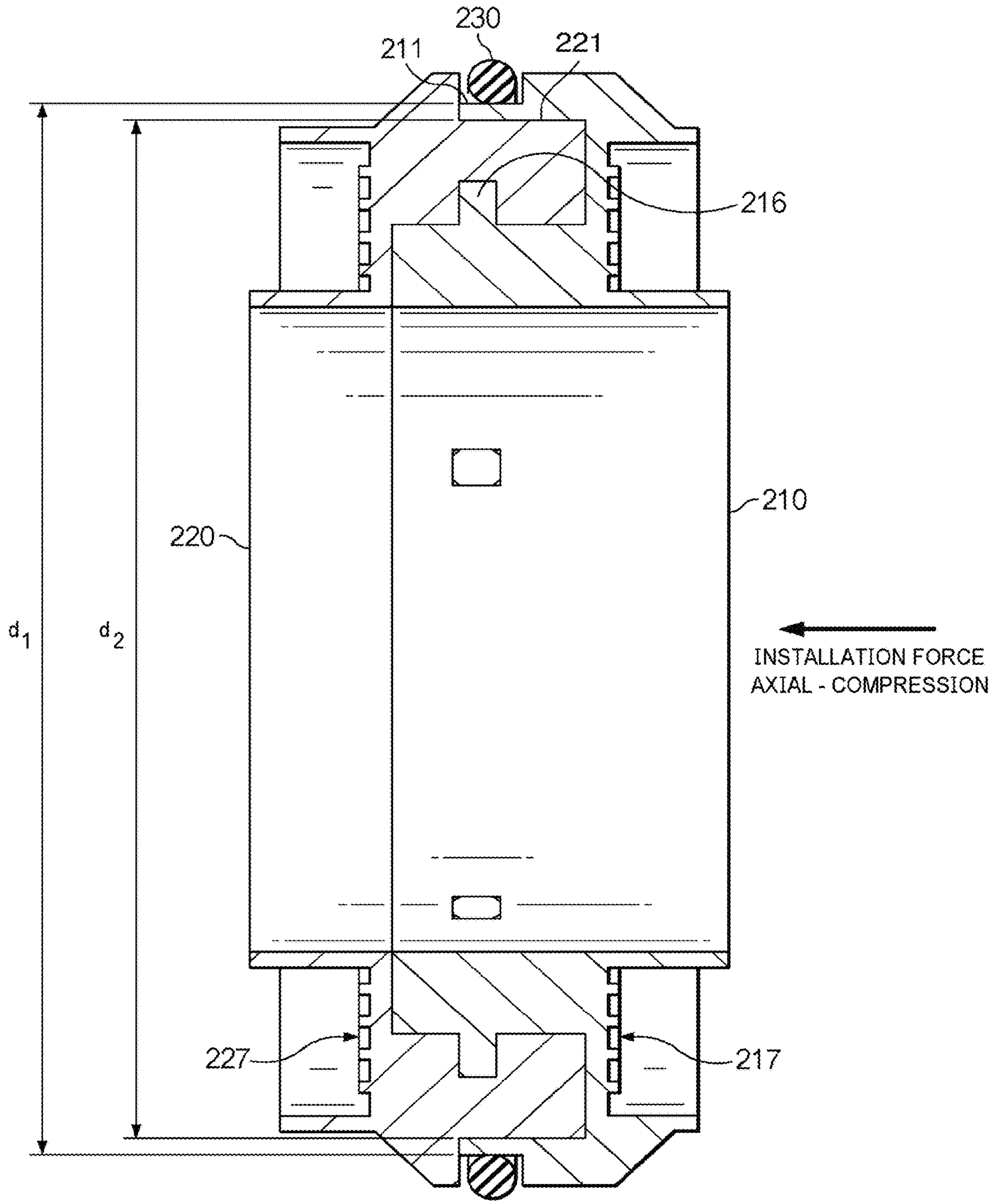
Figure 2D:
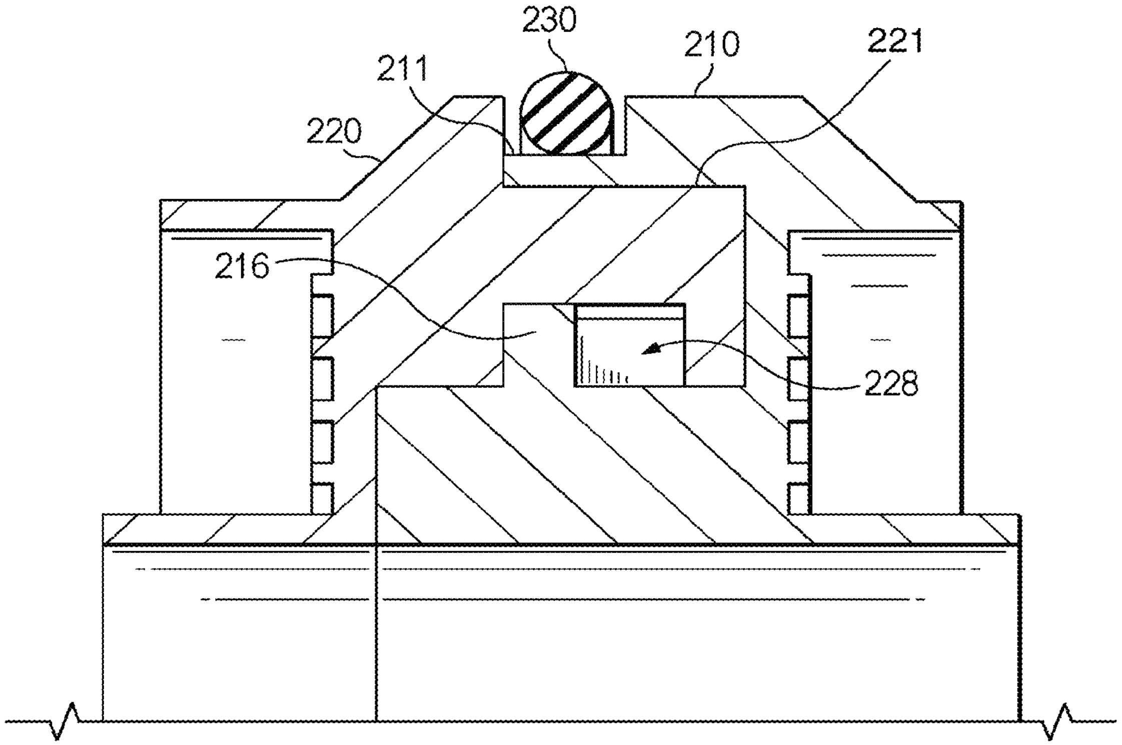
Figure 2E:
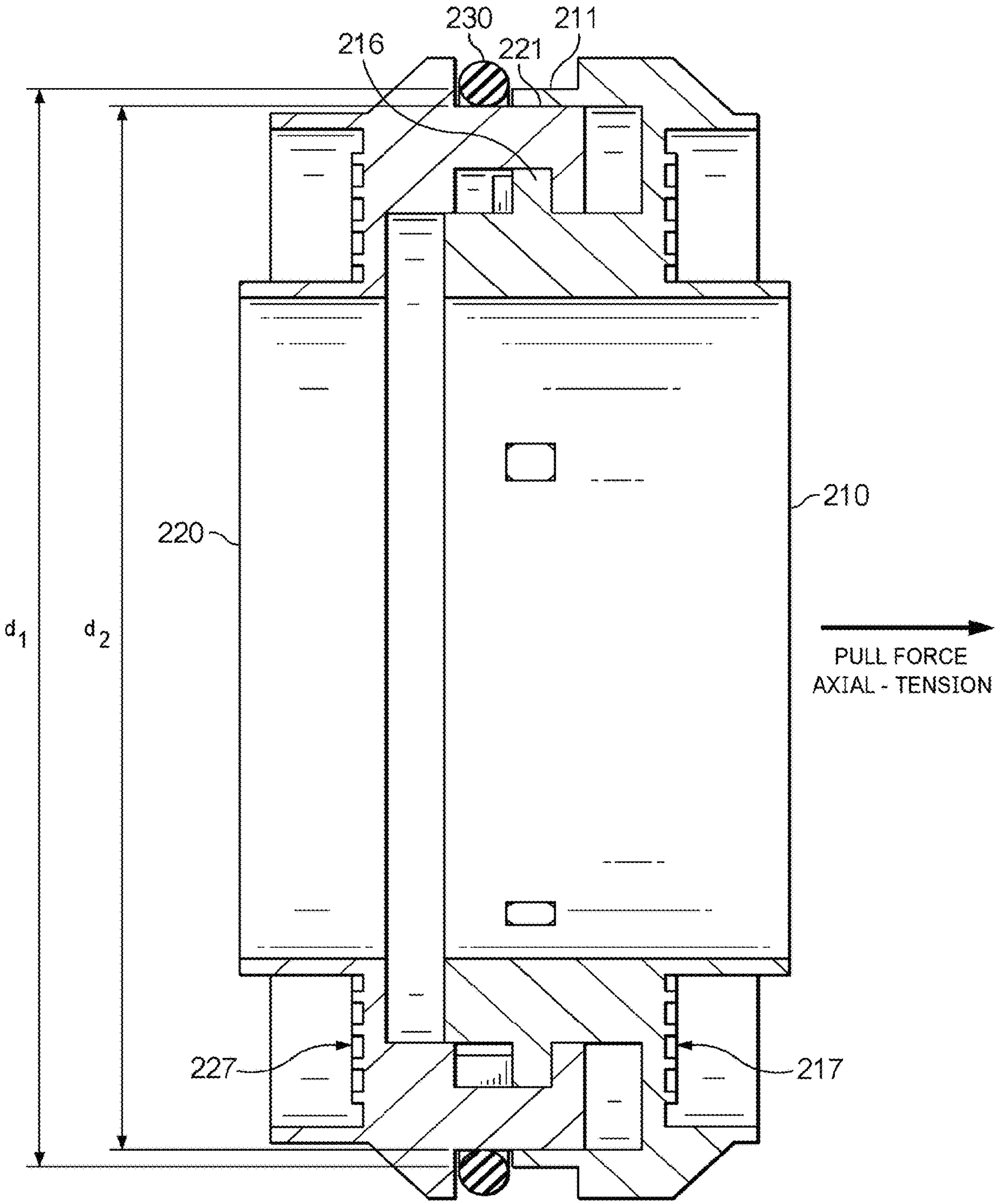
Figure 2F:
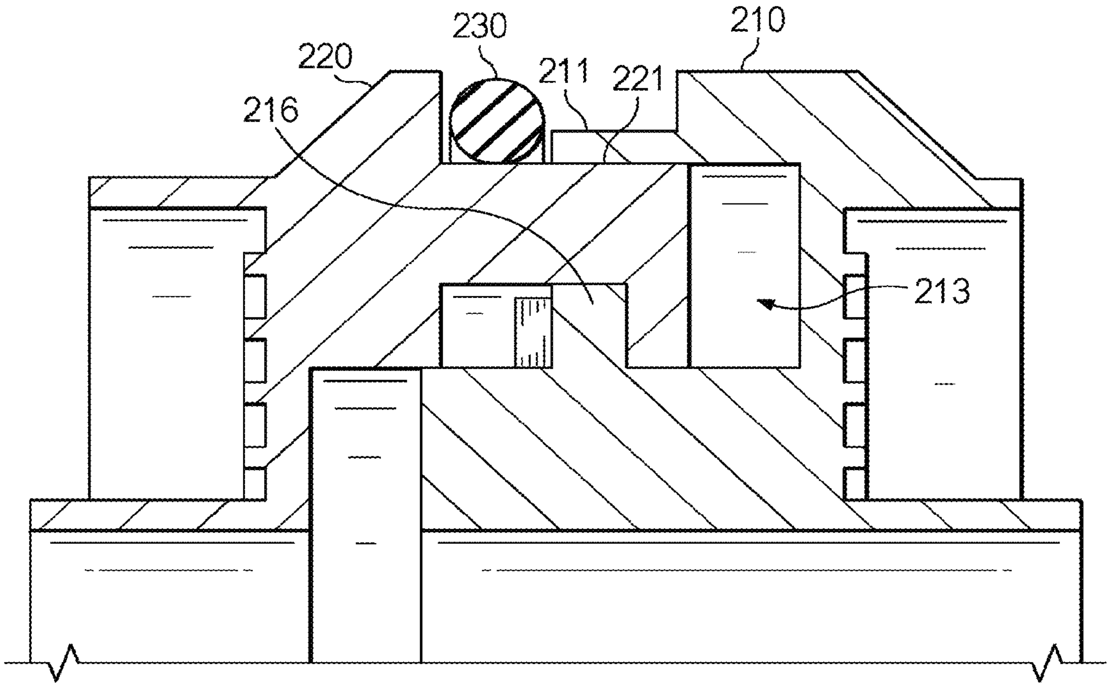
Figure 2G:
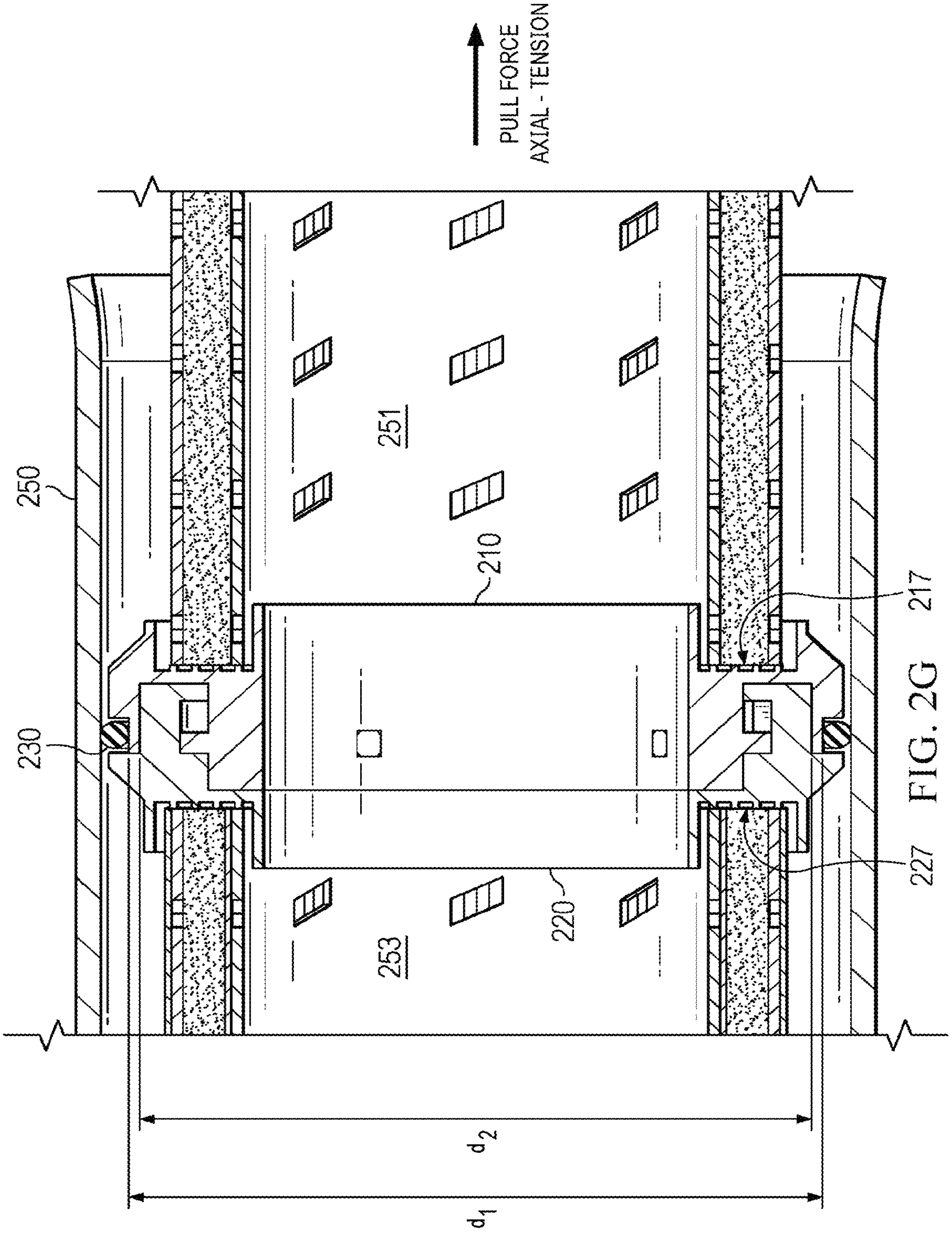
Figure 2H:
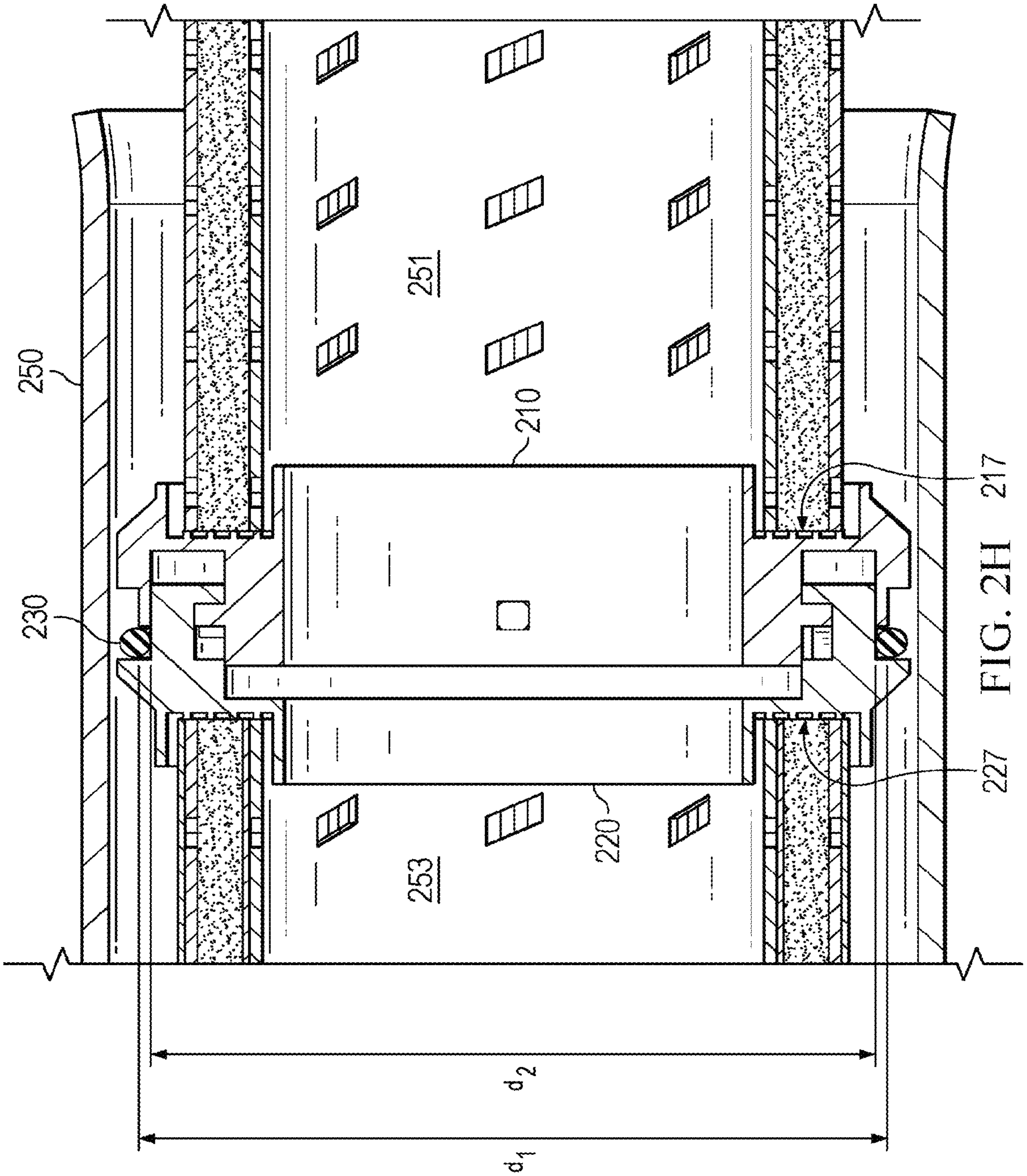
Figure 2I:
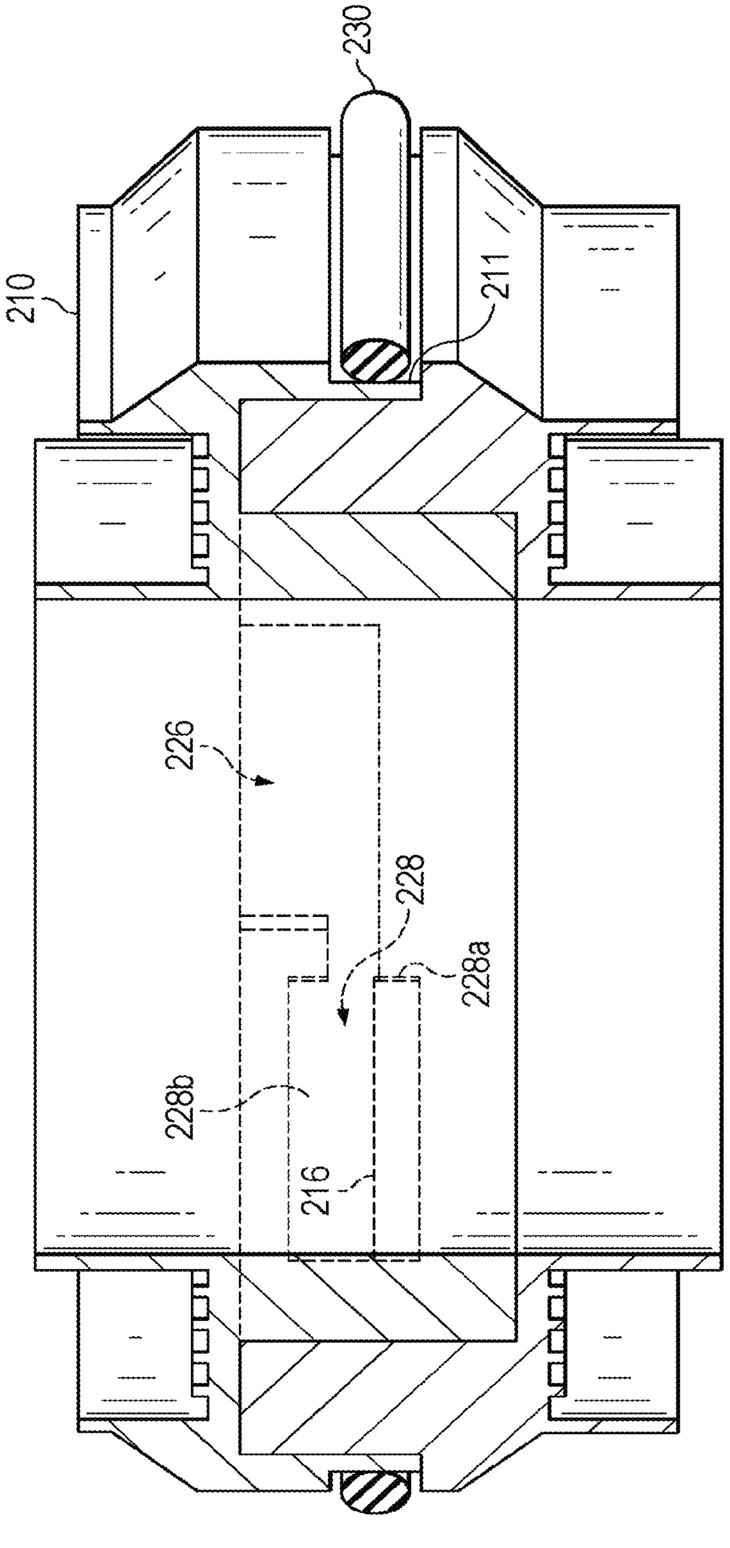
Figure 2J:
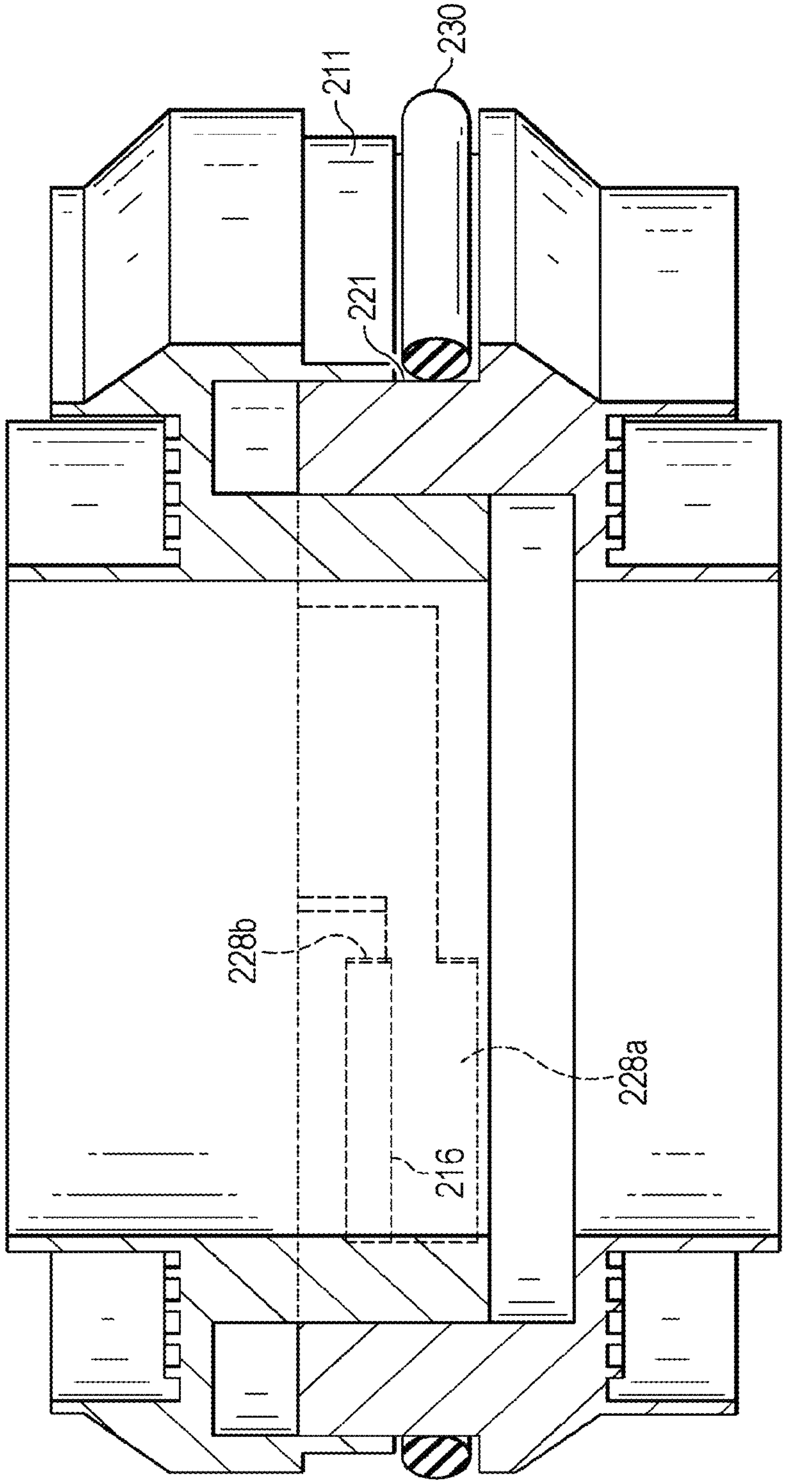
Figure 2K:
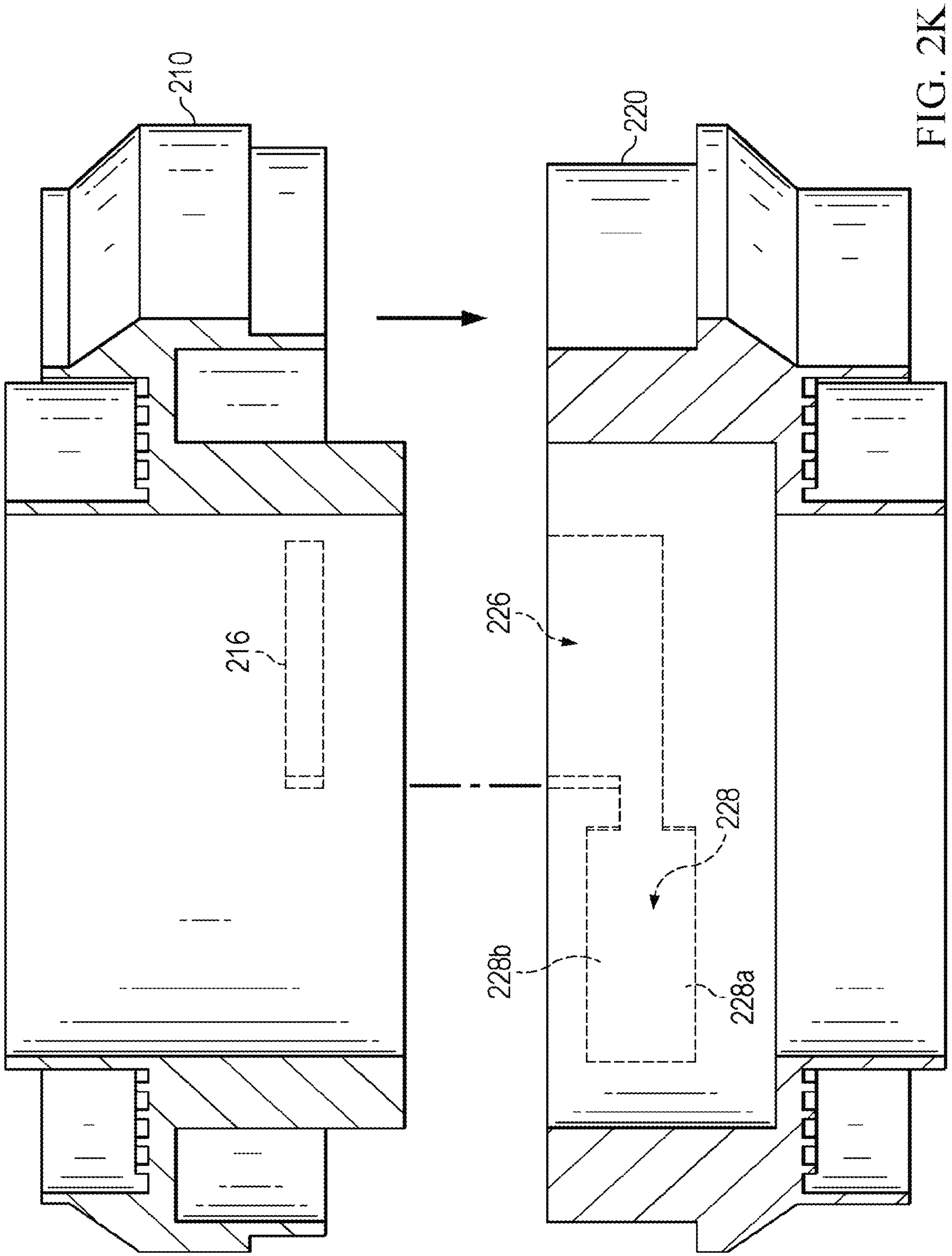
Figure 2L:
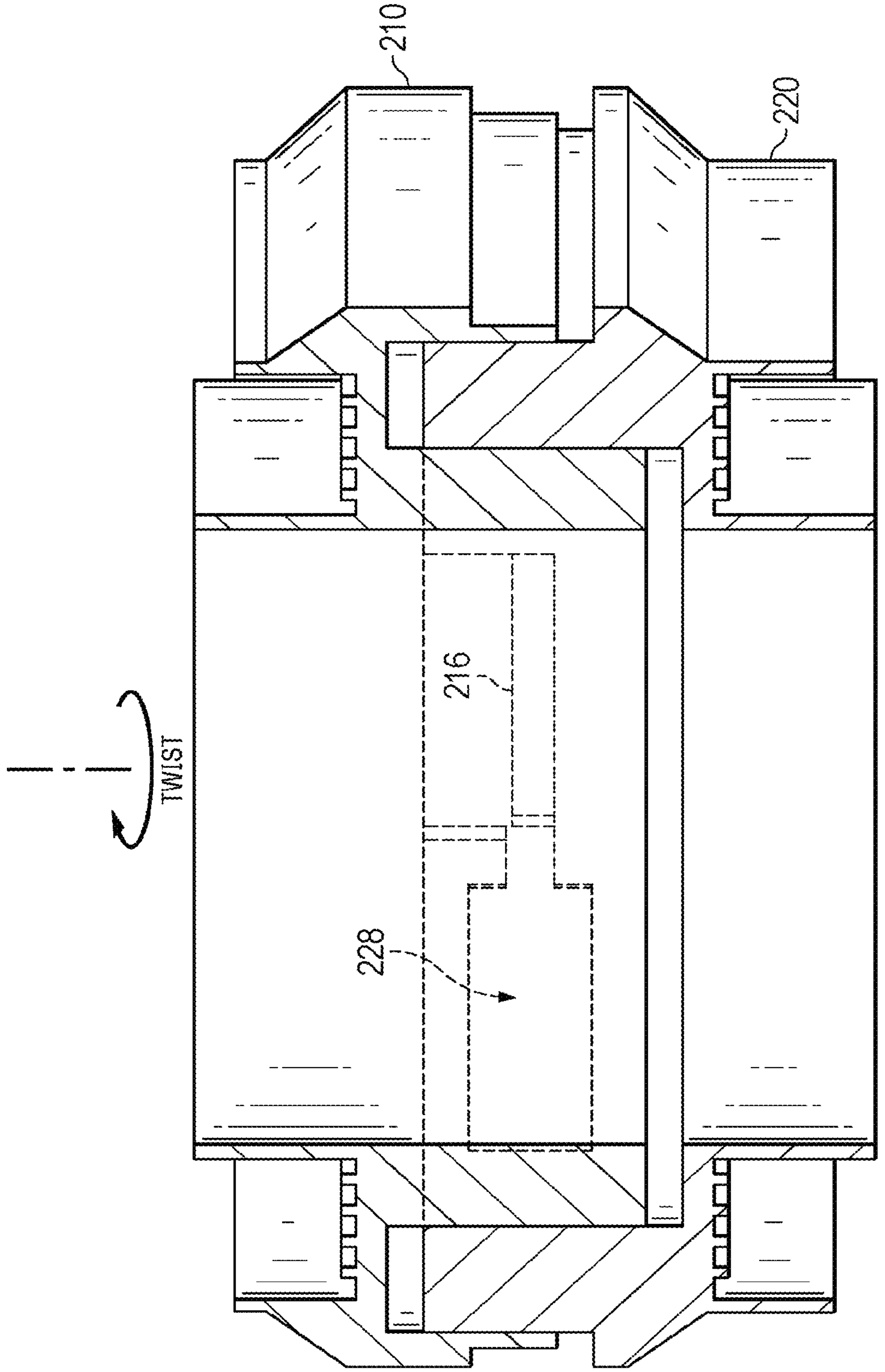
Figure 2M:
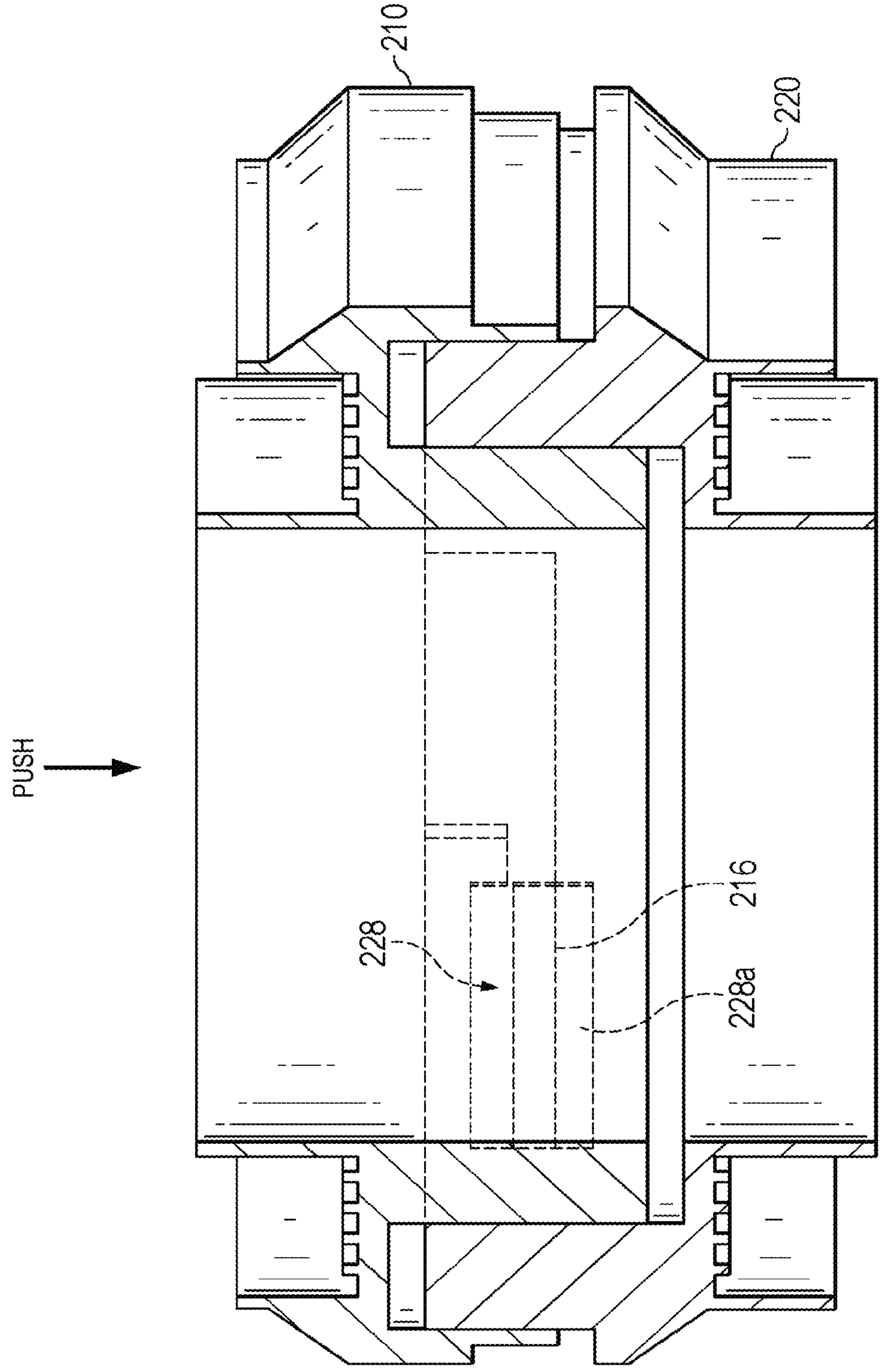
Figure 2N:
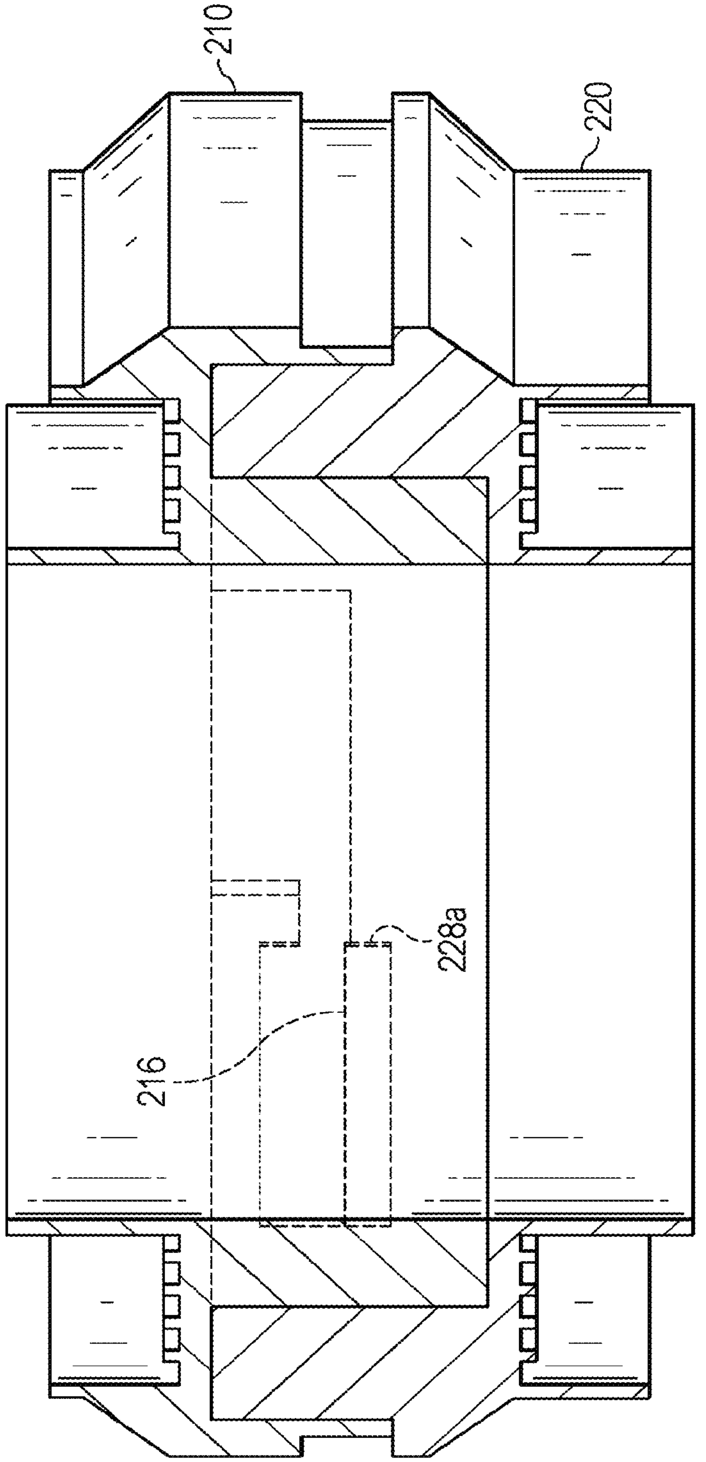

Please refer to FIGS. 2A-N that illustrate another embodiment of this disclosure. This embodiment is similar to FIGS. 1A-J above, except the coupling between the two end caps are twist-locked together instead of snap fit.

FIG. 2A shows a perspective view of the joint cap 200, and FIG. 2B shows an exploded view of the joint cap 200, comprising a first end cap 210, a second end cap 220, and an o-ring seal 230. The first end cap 210 has four holes 215, and the second end cap 220 also has four holes 225 corresponding to those on the first end cap 210. Four retaining pins 240 are provided, such that when the first end cap 210 couples with the second end cap 220, the four retaining pins 240 can be inserted into the four holes 215, 225 to maintain the coupling between the two end caps 210, 220.

To couple the first end cap 210 with the second end cap 220, an insert (216 in FIG. 2C) on the first end cap 210 is first aligned with a cut out 226 on the second end cap 220. The cut out 226 then extends annularly to a pocket 228, so that once the insert 216 is inserted into the cut out 226, the user can then twist the first end cap (that is connected to a filter media) to securely couple the two end caps together.

In operation prior to installation, as shown in the cross-sectional view in FIG. 2C, the o-ring seal 230 seats on an annular ledge 211 of the first end cap 210 having a first diameter $d_1$. Correspondingly, the second end cap 220 has an annular seat surface 221 of a second diameter $d_2$. The second diameter $d_2$ is smaller than the first diameter $d_1$. The first end cap 210 has an annular recess 217 to be securely connected to a filter media (not shown, further discussed with reference to FIG. 2G). Similarly, the second end cap 220 has an annular recess 227 to be securely connected to a filter media. An enlarged view of the top portion of FIG. 2C is shown in FIG. 2D.

As shown in FIGS. 2C and 2D, the pocket 228 in the second end cap 220 allows relative twisting movement between the two end caps 210, 220 at assembling. In FIG. 2C, the arrow shows the direction of insertion into a filter receiver inside filter vessel (not shown). The axial compressive force ensures that the o-ring seal 230 remains sitting on the ledge 211 of the first diameter $d_1$. During operation, the differential pressure by fluid across the filter element will hold it in place.

FIG. 2I shows a similar but semi-3D view of the two end caps 210, 220 being twist-locked together. It is clear shown that the o-ring 230 sits on the annular ledge 211 of the first end cap 210, while the insert 216 now enters the pocket 228 through the cut out 226 on the second end cap 220. The pocket 228 has a locked end 228*a* and an open end 228*b*. The size of the locked end 228*a* and the open end 228*b* are sized such that they prevent the insert 216 from having any rotational movement, thereby preventing the full disengagement of the two end caps 210, 220. When the two end caps are twist locked, the insert 216 enters the locked end 228*a*, which prevents the first end cap 210 from being untwisted, thus keeping the two end caps joined.

Please refer now to FIGS. 2E-F, which shows the "disengage" configuration. When the user decides to remove the filter elements from the vessel, the filter element will be pulled away as shown in the arrow. When the removal becomes difficult, the user can pull the first filter section to allow the first end cap 210 to move away from the second end cap 220 ("disengage"). The friction between the o-ring seal 230 and the vessel (see FIG. 2G-H) causes the o-ring to roll back into the seating surface 221 on the second end cap 220 that is previously covered by the ledge 211. By design, the seating surface 221 on the second end cap 220 has a smaller diameter $d_2$, and the o-ring seal 230, made of elastic material, now shrinks in diameter and reduces its contact surface with the vessel, if at all. An enlarged view of the top portion of FIG. 2E is shown in FIG. 2F.

FIG. 2J shows a similar but semi-3D view of the two end caps 210, 220 being pulled away as compared to FIG. 2I, but the two end caps are still connected. As shown in FIG. 2J, the two end caps 210, 220 are being pulled away without rotational movement, thus allowing the insert 216 to move to the open end 228*b* of the pocket 228.

The screw-in (or twist-lock) process of the two end caps can further illustrated with reference to FIGS. 2K-N. In FIG. 2K, the first end cap 210 aligns with the second end cap 220 by aiming the insert 216 at the cut out 226, as discussed above. The cut out 226 is annually connected to the pocket 228, and the pocket 228 can be further divided, longitudinally, into a locked end 228*a* and an open end 228*b*.

In FIG. 2L, The two end caps 210, 220 are pushed together, and the insert 216 enters the cutout 226. Note that the connection between the cut out 226 and the pocket 228 is along the annual direction, thus twisting the first end cap 210 (or the second end cap 220 towards the opposite direction) is the only way to turn the insert 216 into the pocket 228, as shown in FIG. 2M.

Once the insert 216 is in the pocket 228, the user can further push the first end cap 210 toward the second end cap 220, thereby moving the insert 216 into the locked end 228*a* of the pocket 228, as shown in FIG. 2N. This would complete the twist-locking of the two end caps 210, 220.

Please refer to FIGS. 2G-H that show the extraction of the filter element. As shown in FIG. 2G, the joint cap is connected to a first filter section 251 at the first recess 217 of the first end cap 210, and connected to a second filter section 253 at the second recess 227 of the second end cap 220. The o-ring seal 230 sits on the ledge on the first end cap 210, and due to its larger diameter $d_1$, the o-ring seal 230 contacts the inner surface of the vessel 250, thus creating a seal separating the first filter section 251 from the second filter section 253. A pull force is applied according to the arrow, thus pulling the first end cap 210 slightly away from the second end cap 220, revealing the seating surface 221 that is previously covered by the ledge 211.

Due to the friction force between the o-ring seal 230 and the inner surface of the vessel 250, the o-ring seal rolls back to the now-revealed seating surface 221. Because of the smaller diameter $d_2$ of the seating surface 221, the o-ring seal 230 now shrinks in diameter and no longer contacts the inner surface of the vessel 250, thus reducing or eliminating the friction force. The filter element can then be easily extracted from the vessel 250.

Example 3

Another embodiment of this disclosure can be illustrated with reference to FIGS. 3A-H. Unlike FIGS. 1A-H and 2A-H, this embodiment utilizes a single joint cap 300 instead of two end caps that connect with the first and second filter sections. However, a retainer ring 320 is provided to effectuate the dual-diameter design.

Figure 3A:
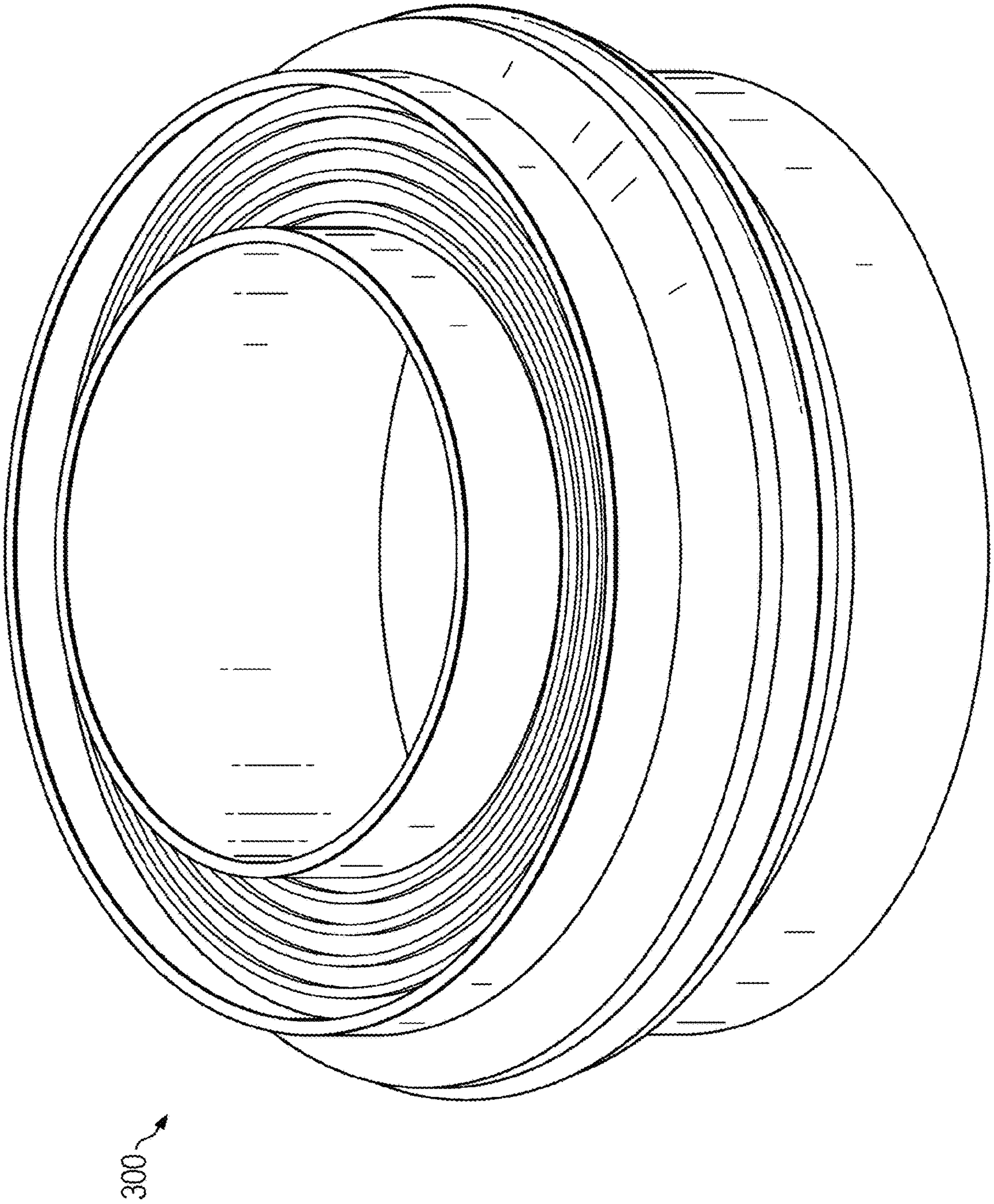
FIG. 3A-H. Illustration of the end cap according to another embodiment of this disclosure.
Figure 3B:
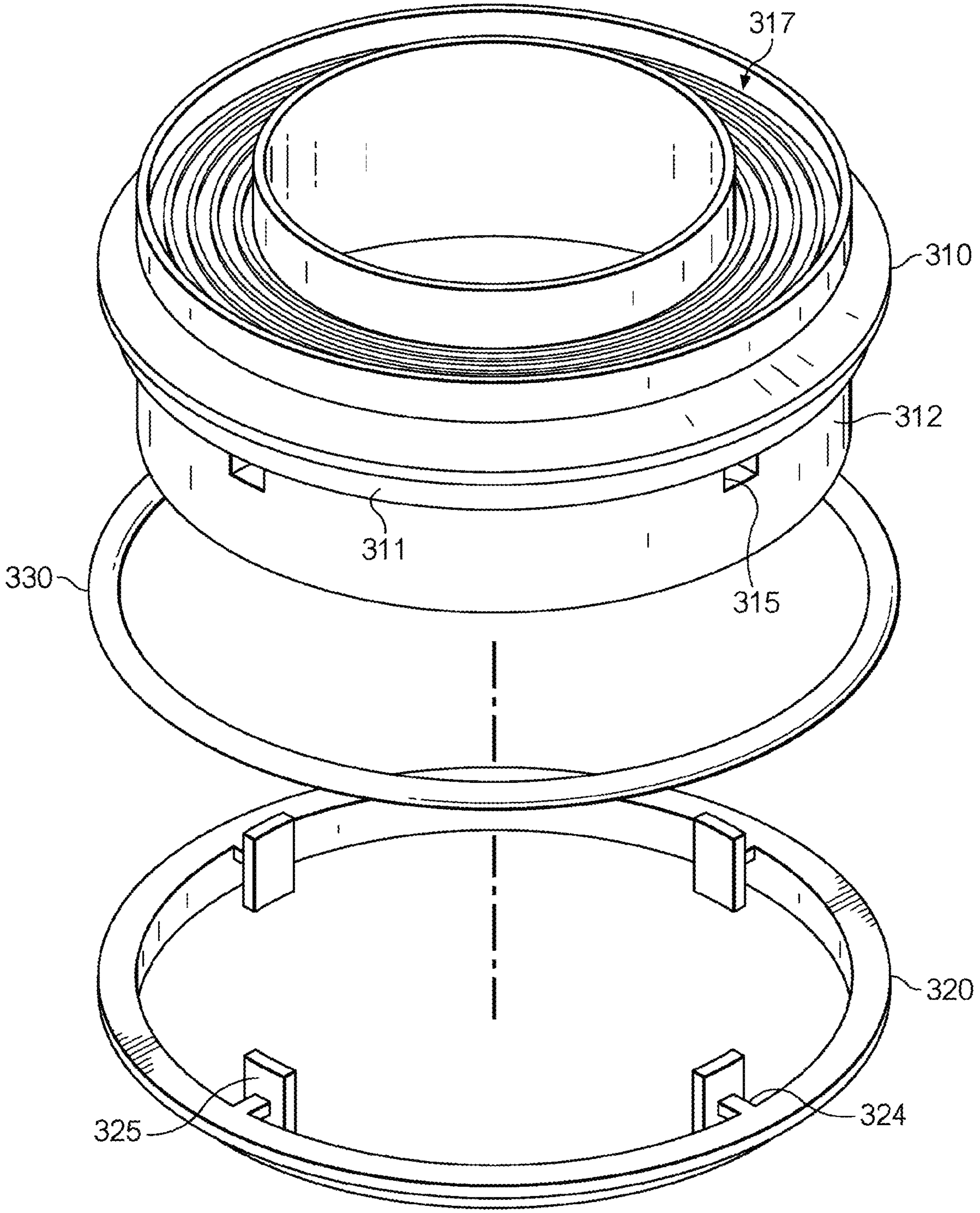

FIG. 3A is a perspective view of the joint cap 300 of this embodiment. FIG. 3B shows an exploded view of the joint cap 300, comprising an end cap 310, a retainer ring 320, and an o-ring seal 330. The end cap 310 has an annular ledge 311 of a first diameter and a seating surface 312 of a second diameter. The second diameter is smaller than the first diameter.

To assemble, the end cap 310 has four holes 315 on the seating surface 312. The retainer ring 320 has four insertion tabs 325 extending radially inward from the circumference through stems 324. The locations of the insertion tabs correspond to the locations of the four holes 315. In this embodiment, the insertion tabs 325 are configured such that once inserted into the holes, the retainer ring 320 can slide along the axial direction without falling off the end cap 310, as further discussed below with regard to FIG. 3C.

Figure 3C:
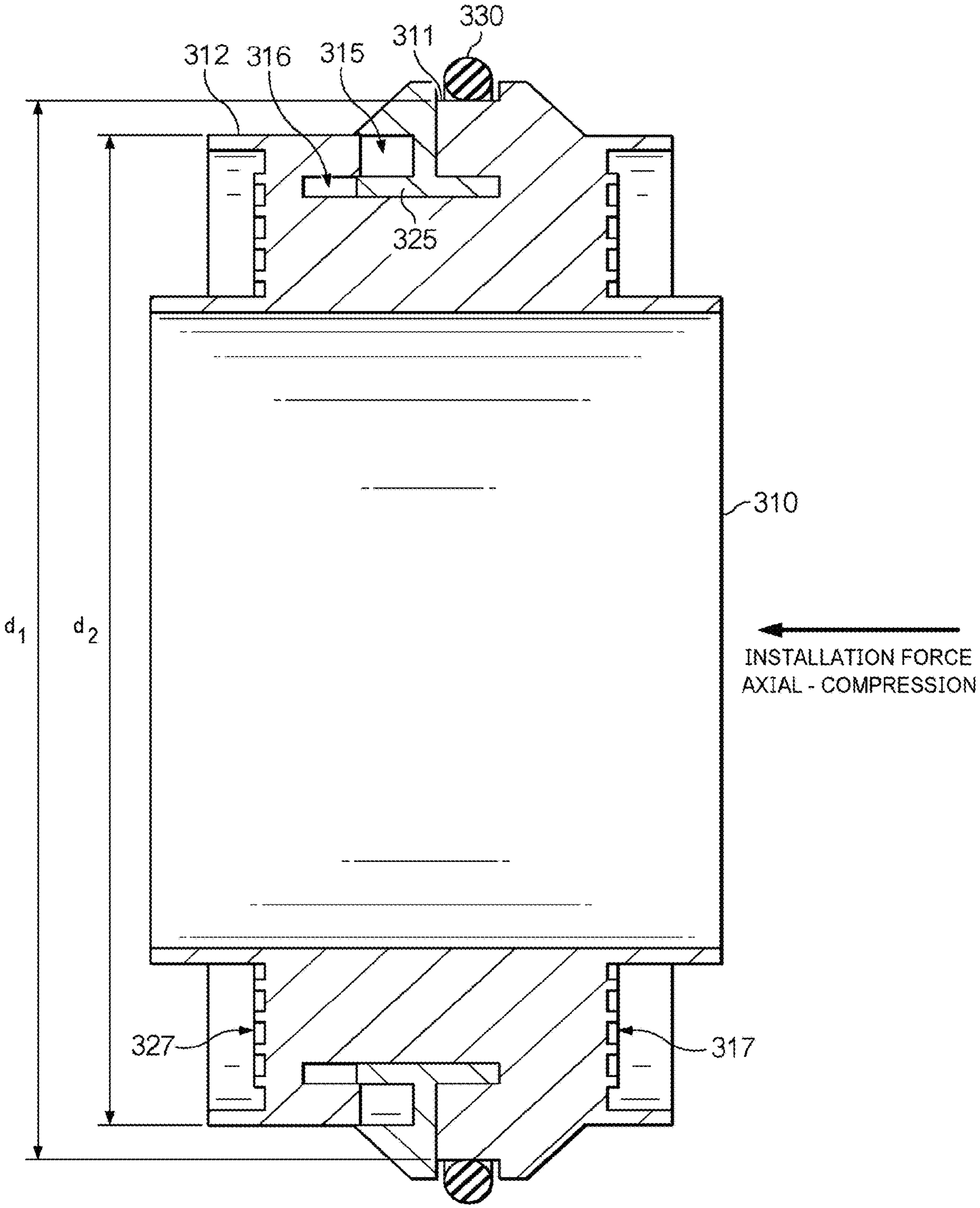
Figure 3D:
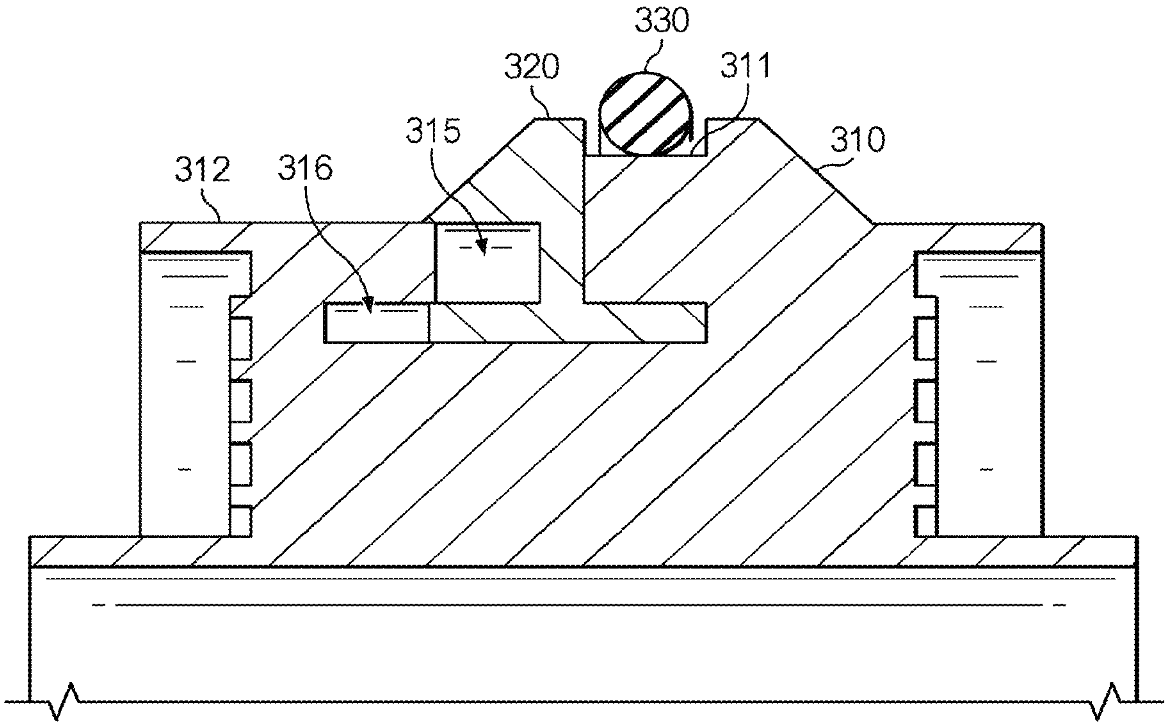

In operation prior to installation, as shown in the cross-sectional view in FIG. 3C, the o-ring seal 330 seats on the annular ledge 311 of the first end cap 310 having a first diameter $d_1$. The annular seat surface 312 has a second diameter $d_2$. The second diameter $d_2$ is smaller than the first diameter $d_1$ as shown. The end cap 310 has an annular recess 317 on one side to be securely connected to a first filter media (not shown, further discussed with reference to FIG. 3G), and an annular recess 327 on the other side to be securely connected to a second filter media. An enlarged view of the top portion of FIG. 3C is shown in FIG. 3D.

The hole 315 first extends perpendicular from the seating surface 312, and then parallel to the seating surface to form a pocket 316. The pocket 316 allows the insertion tab 325 to slide therein, hence the retainer ring 320 sliding at an axial direction relative to the end cap 310.

As shown in FIG. 3C, the arrow shows the direction of insertion into a filter vessel (not shown). The axial compressive force ensures that the o-ring seal 330 remains sitting on the ledge 311 of the first diameter $d_1$. A snap mechanism similar to that previously described regarding 116, 126 may be added to help secure the retainer ring in place.

Figure 3E:
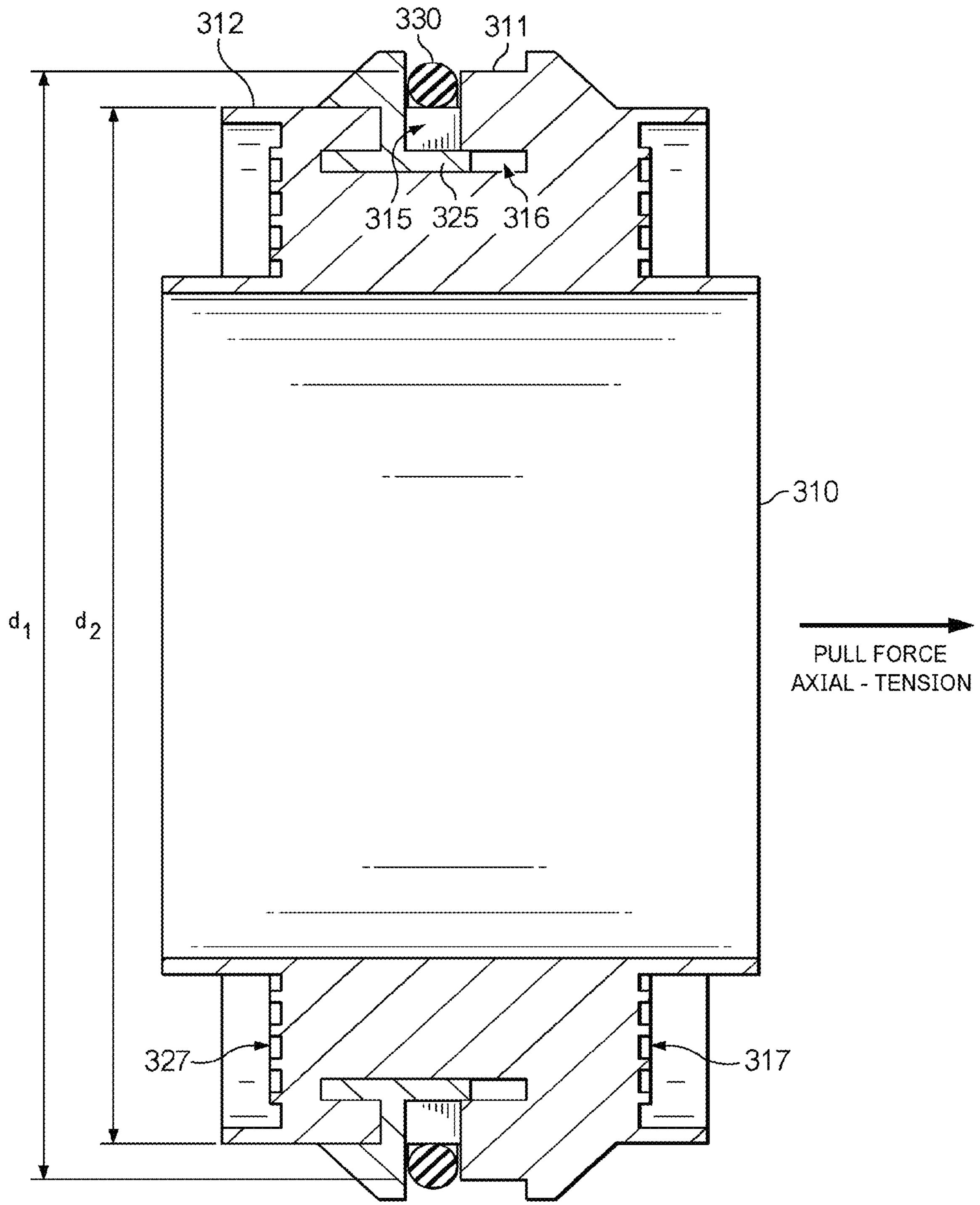
Figure 3F:
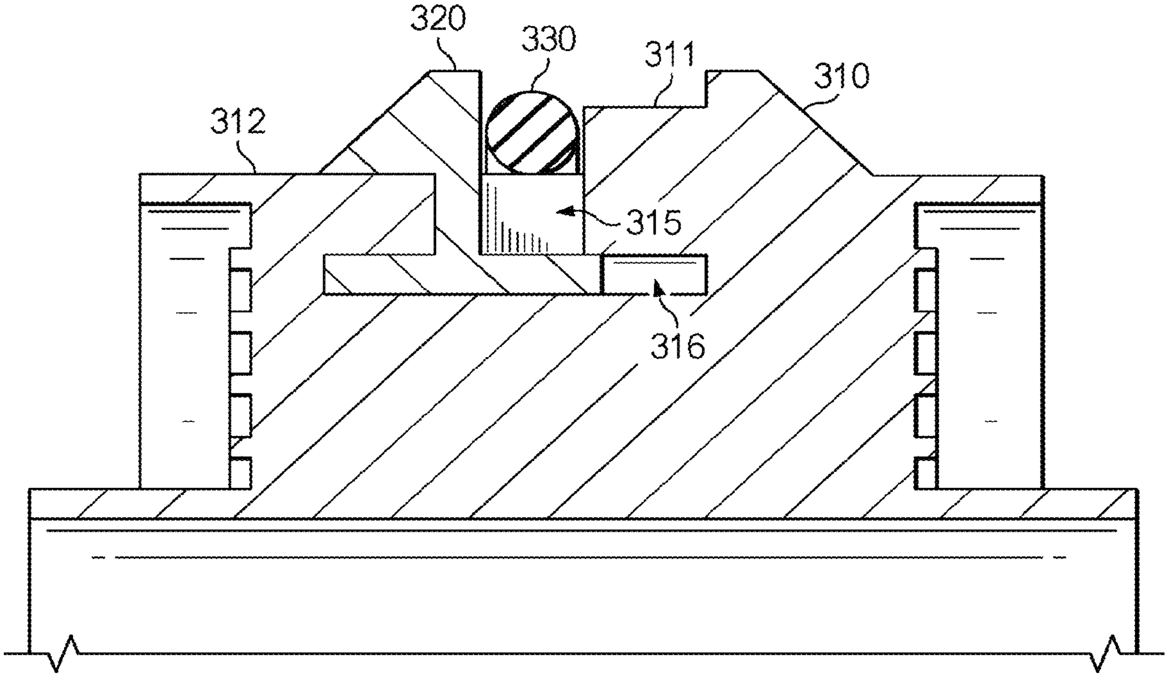

Please refer now to FIGS. 3E-F, which shows the "disengage" configuration in these cross-sectional views. When the user decides to remove the filter elements from the vessel, the filter element will be pulled away with a force as shown in the arrow. The friction between the o-ring seal 330 and the filter receiver (see FIG. 3G-H) in the filter vessel causes the o-ring to push the retainer ring 320 away from the ledge 311, thereby creating a gap between the retainer ring 320 and the ledge 311. The o-ring seal 330 is then able to roll back into the seating surface 312 that is previously covered by the retainer ring 320. By design, the seating surface 312 has a smaller diameter $d_2$, and the o-ring seal 330, made of elastic material, now shrinks in diameter and reduces its contact with the filter receiver, if at all. An enlarged view of the top portion of FIG. 3E is shown in FIG. 3F. This reduced or eliminated friction force allows an operator to extract the filter element with ease.

Figure 3G:
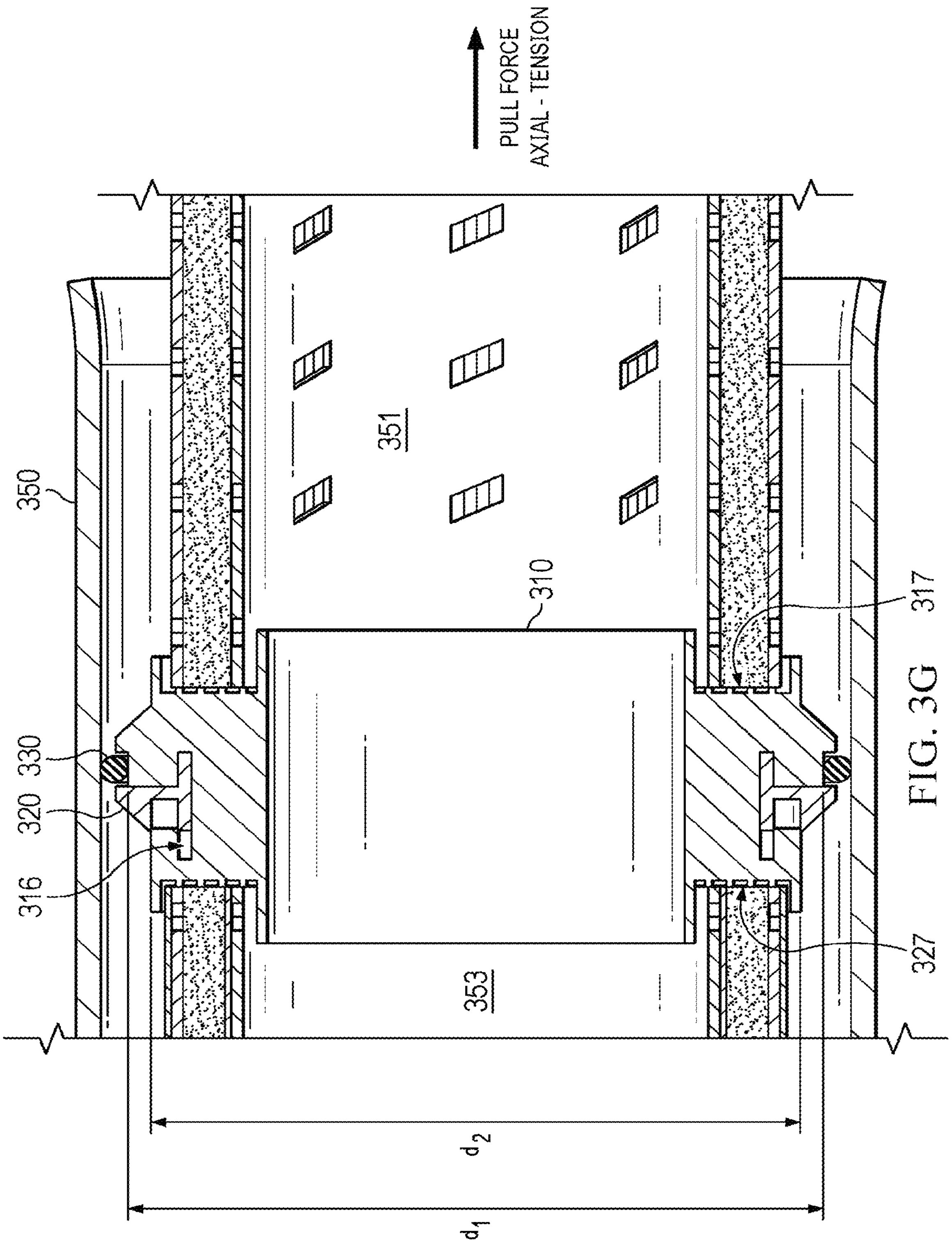
Figure 3H:
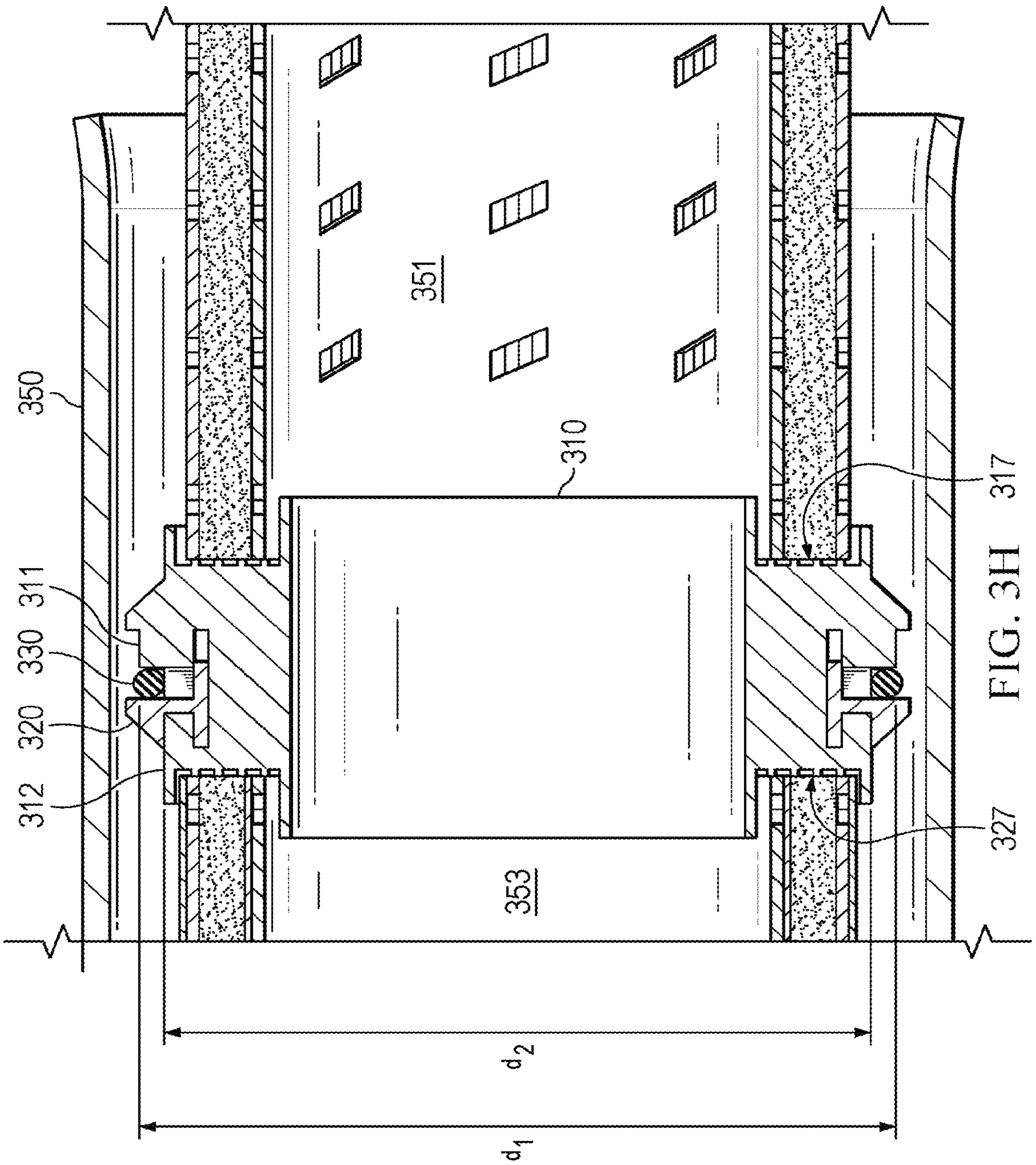

Please refer to FIGS. 3G-H that show the extraction of the filter element. As shown in FIG. 3G, the joint cap is connected to a first filter section 351 at the first recess 317, and connected to a second filter section 353 at the second recess 327. The o-ring seal 330 sits on the ledge 311, and because of its larger diameter $d_1$, the o-ring seal 130 contacts the inner surface of the filter receiver 350 within a filter housing, thus creating a seal separating the first filter section 351 from the second filter section 353. A tensile pull force is applied according to the arrow, and the friction force between the o-ring seal 330 and the inner surface of the filter receiver 350 causes the o-ring seal 330 to push against the retainer ring 320, which then slides toward the left relative to the end cap 310. The o-ring seal 310 then rolls back to the now-revealed seating surface 312. Because of the smaller diameter $d_2$ of the seating surface 312, the o-ring seal 330 now shrinks in diameter and no longer contacts the inner surface of the filter receiver 350, thus reducing or eliminating the friction force. The filter element can then be easily extracted from the filter receiver 350.

Although the embodiments describe the end cap(s) being used to connect two filter sections, the same dual-diameter design can be readily applied as an end cap to a single filter section that is being inserted into a filter receiver. The design would look similar to Example 3, with the exception that only one annular recess is necessary because there is only one filter section to be capped.

Example 4

Figure 5A:
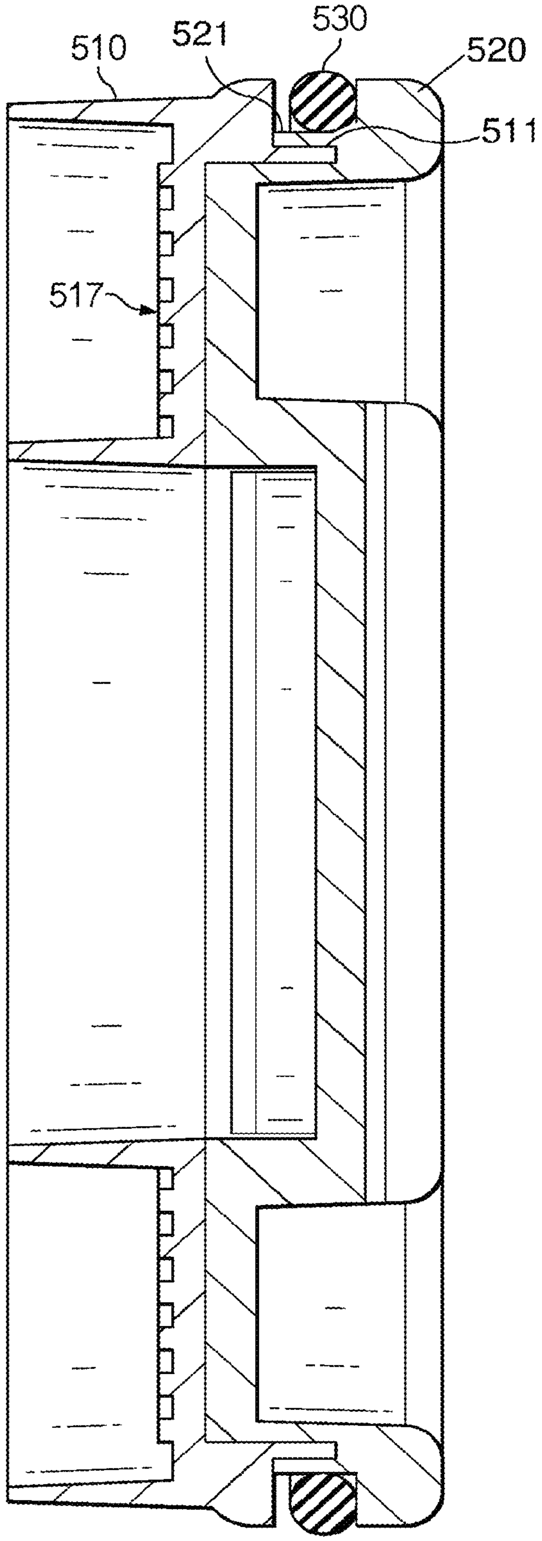
FIG. 5A-D. Illustration of the end cap according to an embodiment of this disclosure as used in a standard single-element configuration.
Figure 5B:
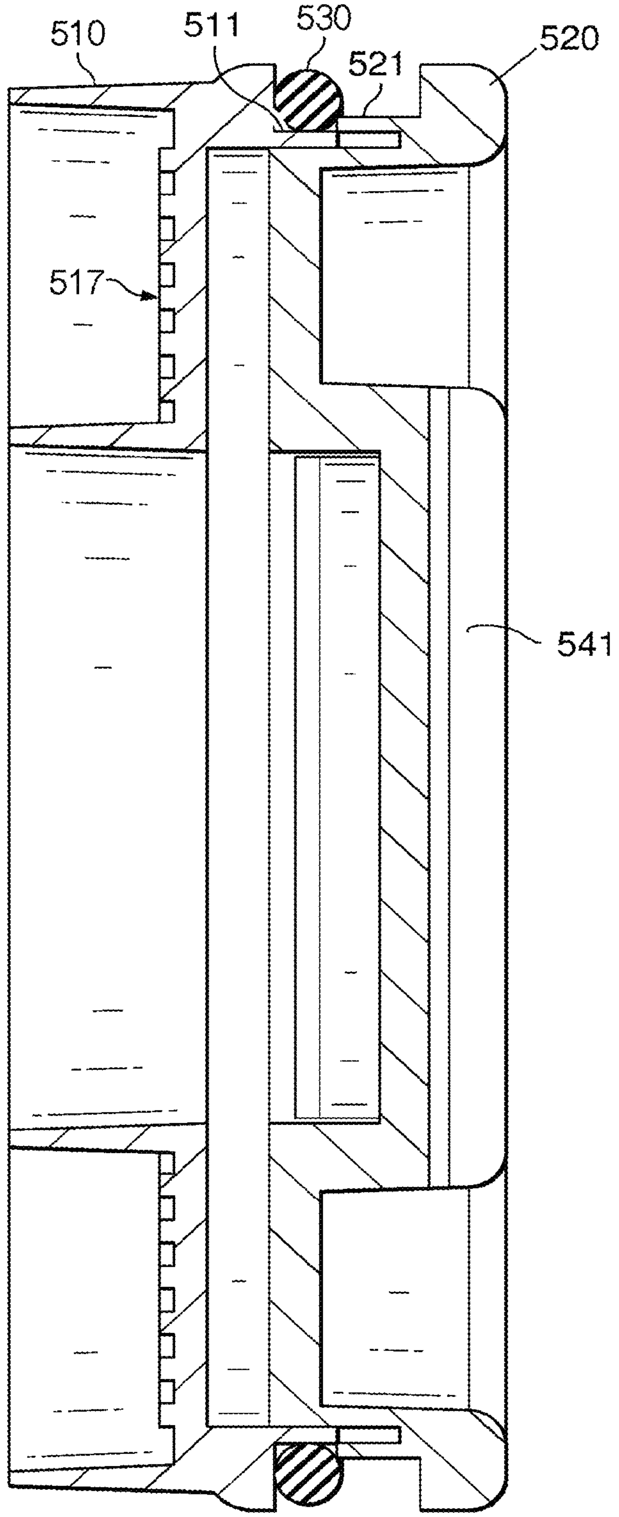
Figure 5C:
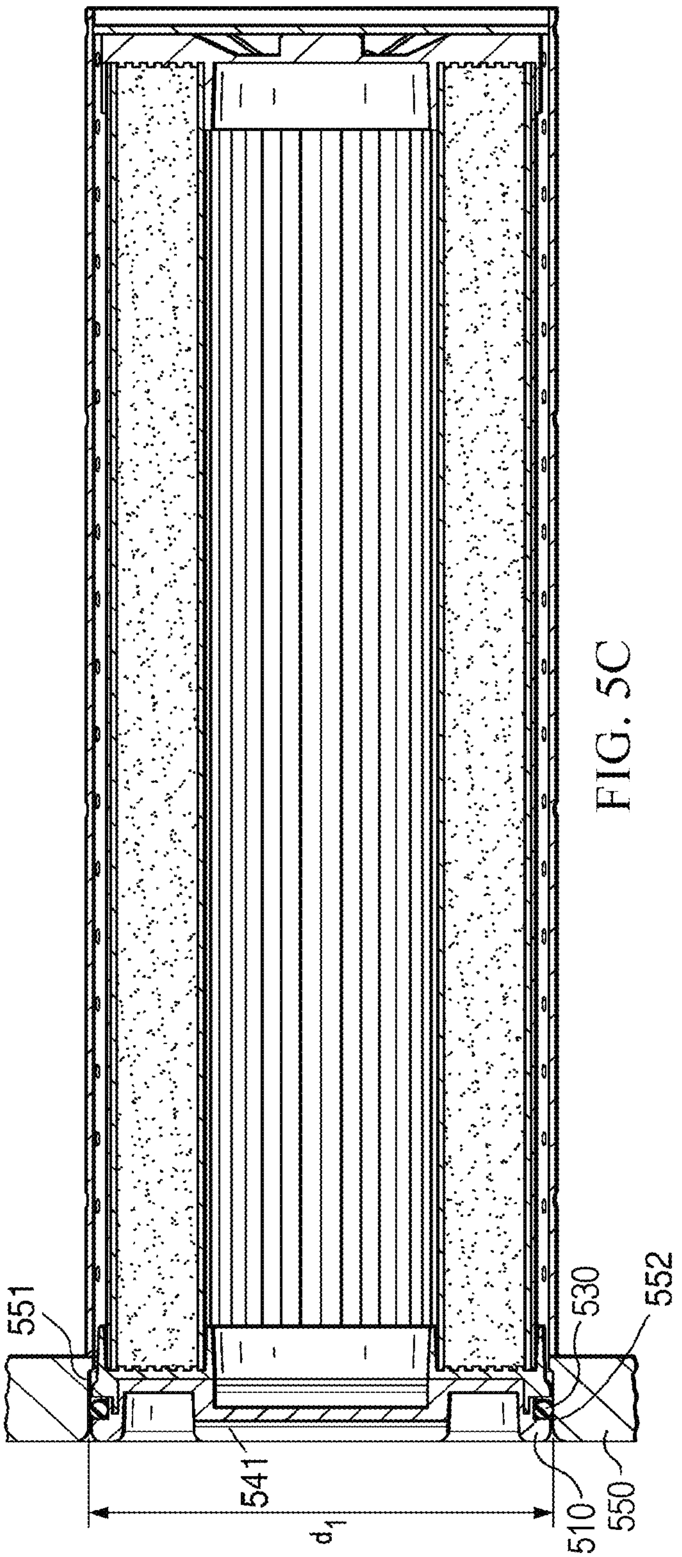

Referring now to FIGS. 5A-D, which shows the end cap and seal of this disclosure being used in a standard single-element configuration. As shown in FIG. 5A, the end cap comprises a first portion 510 and a second portion 520 that are coupled together but can be slightly pulled apart. The first portion 510 has an annular ledge 511, and the second portion 520 has an annular seat surface 521. In the closed state, an o-ring seal 530 sits on the annular seat surface 521, and has an overall diameter of $d_1$, wherein $d_1$ is slightly larger than the inner diameter of the tubesheet or separation plate 550 that separates the clean side from the dirty side, such that in the closed state the o-ring seal 530 contacts the inner surface of the vessel 550 to provide friction force, as shown in FIG. 5C.

Figure 5D:
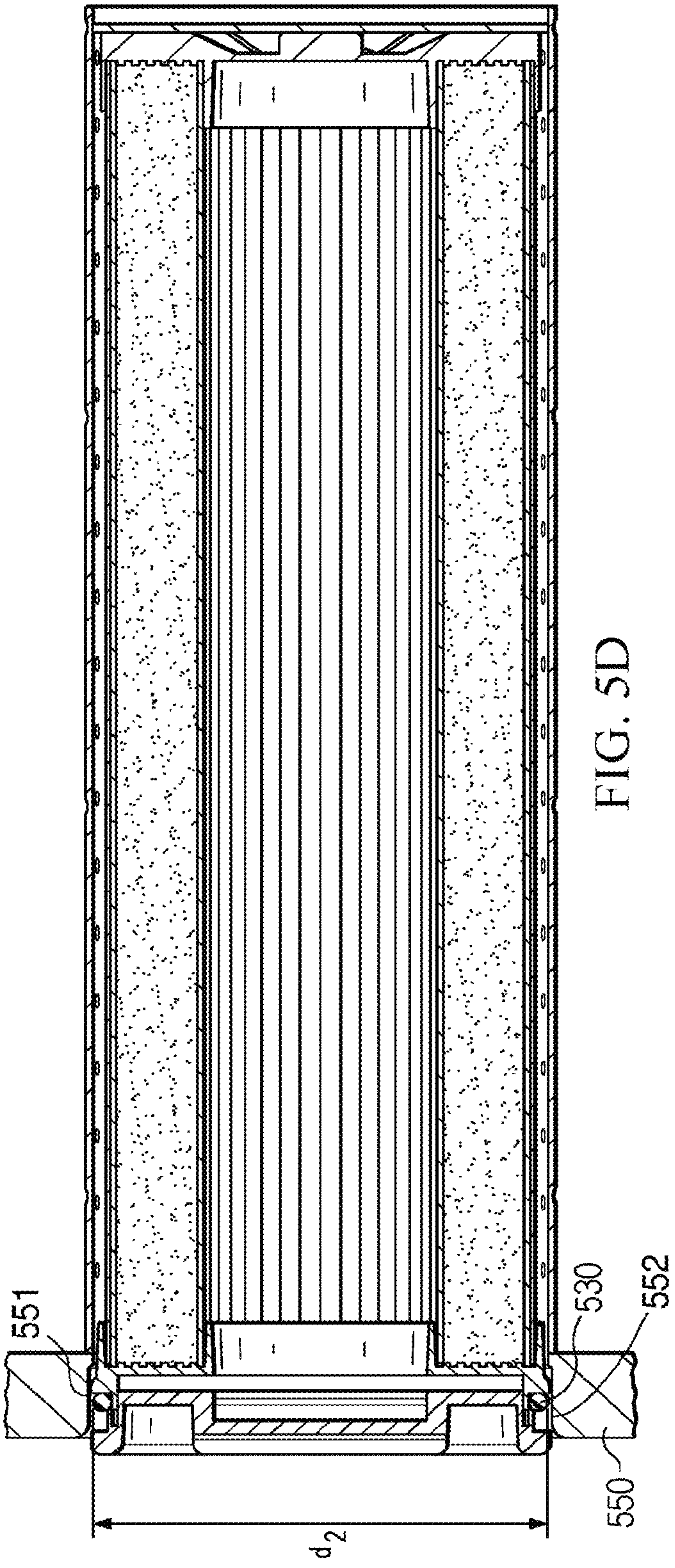

When removal of the filter element is desired, the user simply pull the filter element by the handle 541 as shown in FIG. 5B, and the friction force between the o-ring seal 530 and the inner surface 551, 552 of the vessel tubesheet 550 will cause the second portion 520 to slightly separate from the first portion 510 to reveal the annular seat surface 521. The o-ring seal 530 will shrink and drop on to the annular ledge 511, resulting in an overall diameter $d_2$. Diameter $d_2$ is slightly smaller than the inner diameter of the vessel tubesheet 550 between inner surfaces 551, 552, and therefore the friction force no longer exists to hold the end cap in place. User can then easily remove the filter as shown in FIG. 5D.

By using the end cap of this disclosure, the filter element can be easily installed. More importantly, the two-diameter configuration of the end cap allows the user to easily and safely remove the filter element from the vessel without having to use additional tools to retrieve the o-ring seal that would have fallen off from the filter element in a prior art design, where the misplaced o-ring seal may remain on the clean side of the vessel to potentially foul or plug downstream equipment. The end cap of this disclosure also provides the added convenience of safely and easily extracting the filter elements without breaking the handle or the filter elements themselves, as in those scenarios more tools would be necessary to retrieve broken pieces of the filter elements.

The end cap of this disclosure can be readily modified in various shape and sizes to accommodate different styles of filter elements. The end cap also ensures a positive seal and solves the issue of rapid gas decompression, or o-ring swelling due to chemical or thermal incompatibility during the process by providing a reliable mechanism for releasing the seals compression during extraction.

The end cap ensures that the o-ring seal would not fall off during filter extraction, as opposed to conventional designs that may further require special tools for extraction. The end cap of this disclosure can be safely and easily operated by a user, thus cutting down the manpower and down time for changing the filter elements. The end caps of this disclosure also provides a safe, reliable mechanism for extracting the filter elements without breaking the handles or even the filter elements themselves. Additionally, the joint cap provides reliable seal that doesn't allow fluid bypass, which in turn improves liquid or particle removal efficiency.

What is claimed is:

1. An end cap assembly for facilitating removal of a filter element from a separate filter receiver, comprising:

a) a first end cap having an annular ledge having a first diameter, said first diameter unchanged throughout said annular ledge;

b) an annular seal annularly surrounding the first end cap at the annular ledge; and c) a second end cap having an annular seat having a second diameter that is smaller than the first diameter, said second diameter unchanged throughout said annular seat;

wherein the second end cap is operatively coupled with the first end cap such that when the first end cap slidingly moves to disengage the second end cap, the annular seal moves from the annular ledge of the first end cap to the annular seat of the second end cap.

2. The end cap of claim 1, wherein the coupling between the first end cap and the second end cap is snap fitting, threading and/or twist lock.

3. The end cap of claim 1, wherein the first end cap is securely connected to a first filter section.

4. The end cap of claim 1, wherein the first end cap is securely connected to a first filter section, and the second end cap is securely connected to a second filter section.

5. The end cap of claim 4, wherein the annular seal is configured to contact an inner surface of a separate filter receiver to form an annular seal separating fluid flow between the first filter section and the second filter section.

6. The end cap of claim 1, wherein the annular seal is configured to contact an inner surface of a separate filter receiver to form an annular seal separating fluid flow between a dirty inlet chamber and a clean outlet chamber inside a filter housing.

7. A filter element, comprising:

a) a first filter section having a distal end and a first connecting end, wherein the first filter section is generally cylindrical in shape;

b) a second filter section having a distal end and a second connecting end, wherein the second filter section is generally cylindrical in shape;

c) a first end cap secured to the first connecting end of the first filter section, the first end cap having an annular ledge having a first diameter, said first diameter unchanged throughout said annular ledge;

d) an annular seal annularly surrounding the first end cap; and e) a second end cap secured to the second connecting end of the second filter section, the second end cap having an annular seat having a second diameter that is smaller than the first diameter, said second diameter being throughout said annular seat;

wherein the second end cap is operatively coupled with the first end cap such that when the first end cap moves to disengage the second end cap, the annular seal moves from the annular ledge of the first end cap to the annular seat of the second end cap.

8. The filter element of claim 7, wherein the first end cap is coupled with the second end cap through snap fitting.

9. The filter element of claim 7, wherein the first end cap is coupled with the second end cap through threading or twist-locking.

10. A method of extracting a filter element from a filter receiver, wherein the filter element comprises an end cap securely connected to at least one filter section, the end cap having a first annular surface of a first diameter and a second annular surface of a second diameter that is smaller than the first diameter, said first diameter being throughout said annular surface and said second diameter being throughout said second annular surface, wherein the first annular surface at least partially covers the second annular surface after the filter element is installed, wherein an elastic annular seal sitting on the first annular surface contacts an inner surface of the filter receiver when the filter element is installed therein to provide an annular seal between either side of the elastic seal, and wherein the second annular surface is located adjacent to the first annular surface, the method comprising:

moving the filter element away from the filter receiver, wherein the elastic annular seal is slidingly moved from the first annular surface to the second annular surface to reduce or eliminate contact between the elastic annular seal and the inner surface of the filter receiver.

11. The method of claim 10, wherein the end cap further comprises a retainer ring located on the second annular surface to prevent the elastic annular seal from detaching from the end cap.

* * * * *